(12) United States Patent  
Kalb

(10) Patent No.: US 9,533,430 B1  
(45) Date of Patent: Jan. 3, 2017

(54) PORTABLE ADJUSTABLE CUTTING APPARATUS FOR CUTTING AND SHAPING SINK HOLES IN STONE COUNTERTOPS

(71) Applicant: Robert M. Kalb, Minneapolis, MN (US)

(72) Inventor: Robert M. Kalb, Minneapolis, MN (US)

( * ) Notice: Subject to any disclaimer, the term of this patent is extended or adjusted under 35 U.S.C. 154(b) by 585 days.

(21) Appl. No.: 13/655,396

(22) Filed: Oct. 18, 2012

Related U.S. Application Data

(60) Provisional application No. 61/627,798, filed on Oct. 18, 2011.

(51) Int. Cl.
| | | |
|---|---|---|
| *B28D 1/30* | (2006.01) | |
| *B23D 47/02* | (2006.01) | |
| *B24B 23/02* | (2006.01) | |

(52) U.S. Cl.
CPC .............. *B28D 1/30* (2013.01); *B23D 47/02* (2013.01)

(58) Field of Classification Search
CPC ..... B23D 47/02; B23D 45/024; B23D 45/027; B23D 45/048; B27D 59/00; B27D 59/002; B23B 9/02; B23B 9/04; B28D 1/003; B28D 1/044; B28D 1/045; B28D 1/183; B28D 1/30; G05G 5/24; B23Q 5/385; H01H 43/102
USPC ...................... 125/13.01, 10, 15; 74/575–578
See application file for complete search history.

(56) References Cited

U.S. PATENT DOCUMENTS

| | | | |
|---|---|---|---|
| D4,059 S | * | 5/1870 | Frazier ........................ D15/126 |
| 136,432 A | | 3/1873 | Gear |
| 561,367 A | | 6/1896 | Badger |
| 597,542 A | | 1/1898 | Lorch |
| 897,488 A | * | 9/1908 | Prescott ........................ 83/745 |
| 1,230,696 A | | 6/1917 | Filotico |
| 1,563,844 A | * | 12/1925 | Gerlach ........................ 30/371 |
| 1,830,971 A | * | 11/1931 | Edgar ............................ 451/47 |
| 1,833,785 A | * | 11/1931 | Krieger .......................... 83/98 |
| 1,845,666 A | * | 2/1932 | Jennings ........................ 125/4 |
| 1,971,297 A | | 8/1934 | Donaldson |
| 2,014,229 A | * | 9/1935 | Emmons ................... 125/13.01 |
| 2,020,709 A | | 11/1935 | Walter |
| 2,075,369 A | | 3/1937 | Stetler |

(Continued)

OTHER PUBLICATIONS

Alpha professional tools, http://www.alpha-tools.com/Product.asx?PageCode=420, Oct. 17, 2007.*

*Primary Examiner* — Joseph J Hail  
*Assistant Examiner* — Arman Milanian  
(74) *Attorney, Agent, or Firm* — Albert W. Watkins

(57) ABSTRACT

Three portable apparatus are operative sequentially to cut and shape sink holes in stone countertops, each adjustably engaging with the same prior art sink template to control reveal. A first apparatus makes linear cuts in stone using a disk-shaped saw blade while adjustable flange wheels follow the template. A lift biases the disk-shaped saw blade out of the stone when not cutting. A second apparatus cuts inside corners and curves using a contour saw blade while adjustable guide fences follow the template. The spindle shaft angle can be varied to leave a finished side vertical. A third polishing apparatus uses an abrasive drum and an adjustable rotating rub collar around the drum abrasive that operatively changes a distance between the drum abrasive and sink template to adjust for different diameter drums and adjust as the drum abrasive diameter changes due to wear.

3 Claims, 14 Drawing Sheets

(56) References Cited

U.S. PATENT DOCUMENTS

| | | | | |
|---|---|---|---|---|
| 2,189,246 | A * | 2/1940 | Henry | 451/358 |
| 2,291,058 | A | 7/1942 | Pohl | |
| 2,307,312 | A * | 1/1943 | Whiting | 451/548 |
| 2,318,050 | A | 5/1943 | Boynton | |
| 2,418,737 | A * | 4/1947 | Talboys | 451/231 |
| 2,495,121 | A * | 1/1950 | Moore | 83/57 |
| 2,528,511 | A * | 11/1950 | Graham | B24B 23/08 451/121 |
| 2,592,001 | A | 4/1952 | Bereit | |
| 2,673,725 | A * | 3/1954 | Coates | 299/39.3 |
| 2,736,311 | A | 2/1956 | Coates | |
| 2,773,523 | A * | 12/1956 | Hopla | 83/745 |
| 2,774,191 | A * | 12/1956 | Bouchez | 451/150 |
| 2,783,789 | A | 3/1957 | Konway | |
| 2,787,871 | A | 4/1957 | Le Clercq | |
| 2,818,683 | A | 1/1958 | Nieman et al. | |
| 2,877,105 | A * | 3/1959 | Smith | 51/308 |
| 3,011,530 | A | 12/1961 | Lamb | |
| 3,164,144 | A | 1/1965 | Adams, Jr. | |
| 3,290,834 | A * | 12/1966 | Lindblad | 451/541 |
| 3,323,507 | A | 6/1967 | Schuman | |
| 3,360,298 | A | 12/1967 | Stoljarov et al. | |
| 3,378,307 | A * | 4/1968 | Dempsey | B23Q 5/385 125/14 |
| 3,396,713 | A | 8/1968 | Schuman | |
| 3,722,497 | A * | 3/1973 | Hiestand et al. | 125/14 |
| 3,763,845 | A | 10/1973 | Hiestand et al. | |
| 3,903,658 | A | 9/1975 | Daiuta | |
| 3,988,125 | A * | 10/1976 | Ulsh | 451/231 |
| 4,005,552 | A | 2/1977 | Hoglund et al. | |
| 4,054,179 | A | 10/1977 | Destree | |
| 4,055,160 | A | 10/1977 | Wilson | |
| 4,058,280 | A | 11/1977 | Clancy | |
| 4,134,459 | A | 1/1979 | Hotchen | |
| 4,152,954 | A * | 5/1979 | Stout | G07F 15/12 74/568 T |
| 4,184,719 | A | 1/1980 | Ward | |
| 4,228,617 | A | 10/1980 | Bando | |
| 4,310,198 | A * | 1/1982 | Destree | 299/39.3 |
| 4,311,059 | A * | 1/1982 | Wagle | F16H 27/08 74/116 |
| 4,353,165 | A * | 10/1982 | Albery | 30/376 |
| 4,536,626 | A * | 8/1985 | Wojtanek | 200/35 R |
| 4,552,122 | A * | 11/1985 | Kelly | 125/14 |
| 4,557,245 | A | 12/1985 | Bieri | |
| 4,817,581 | A | 4/1989 | Trentadue | |
| 4,836,494 | A | 6/1989 | Johnsen | |
| 4,909,114 | A * | 3/1990 | Astle | 83/745 |
| 4,928,662 | A * | 5/1990 | Chiuminatta et al. | 125/13.01 |
| 4,979,412 | A | 12/1990 | Anders | |
| 4,982,531 | A | 1/1991 | Biebuyck | |
| 4,986,252 | A | 1/1991 | Holmes et al. | |
| 4,989,372 | A | 2/1991 | Avila et al. | |
| 4,998,775 | A | 3/1991 | Hollifield | |
| 5,035,061 | A | 7/1991 | Bradbury et al. | |
| 5,086,750 | A | 2/1992 | Chiuminatta et al. | |
| 5,176,426 | A * | 1/1993 | Adamson | 299/39.3 |
| 5,186,157 | A | 2/1993 | Bieri | |
| 5,206,999 | A | 5/1993 | Stone | |
| 5,274,963 | A | 1/1994 | Tsur | |
| 5,409,417 | A | 4/1995 | Bando | |
| 5,429,420 | A | 7/1995 | Johnson | |
| 5,482,026 | A | 1/1996 | Russell | |
| 5,540,210 | A * | 7/1996 | Jones | 125/13.01 |
| 5,588,418 | A | 12/1996 | Holmes et al. | |
| 5,595,170 | A * | 1/1997 | Lupi | 125/12 |
| 5,666,939 | A | 9/1997 | Chiuminatta et al. | |
| 5,669,371 | A * | 9/1997 | Rupprecht et al. | 125/13.01 |
| 5,676,126 | A | 10/1997 | Rupprecht et al. | |
| 5,678,314 | A | 10/1997 | Braunbach et al. | |
| 5,732,690 | A | 3/1998 | Ogyu | |
| 5,857,453 | A | 1/1999 | Caven et al. | |
| 5,885,149 | A * | 3/1999 | Gillet et al. | 451/546 |
| 5,921,228 | A | 7/1999 | Watson | |
| 5,941,227 | A * | 8/1999 | Bearden | 125/13.01 |
| 5,947,103 | A | 9/1999 | Saccon | |
| 5,960,780 | A | 10/1999 | Harris | |
| 6,006,735 | A | 12/1999 | Schlough et al. | |
| 6,062,122 | A | 5/2000 | Niemczyk | |
| 6,073,621 | A | 6/2000 | Cetrangolo | |
| 6,112,736 | A | 9/2000 | Bearden | |
| 6,155,245 | A | 12/2000 | Zanzuri | |
| 6,257,225 | B1 | 7/2001 | Harris | |
| 6,263,866 | B1 * | 7/2001 | Tsao | 125/13.01 |
| 6,315,799 | B1 | 11/2001 | Toniolo | |
| 6,367,468 | B1 * | 4/2002 | Edwards et al. | 125/36 |
| 6,397,831 | B1 * | 6/2002 | Plunger et al. | 125/13.01 |
| D465,983 | S * | 11/2002 | Yoshida et al. | D8/70 |
| 6,474,206 | B1 * | 11/2002 | Brunson | 83/471.3 |
| 6,568,088 | B1 * | 5/2003 | Ende | 30/371 |
| 6,712,061 | B1 * | 3/2004 | Kalb | B23D 45/024 125/10 |
| 6,860,260 | B2 * | 3/2005 | Lin | 125/1 |
| 6,997,175 | B2 | 2/2006 | Kalb | |
| 7,229,342 | B1 | 6/2007 | York | |
| 7,373,936 | B1 | 5/2008 | Zagorouiko | |
| 7,516,552 | B2 * | 4/2009 | Yoshida | 30/373 |
| 7,534,164 | B1 * | 5/2009 | Lo | 451/247 |
| 7,770,574 | B1 * | 8/2010 | Ferreira | 125/13.01 |
| 2008/0153399 | A1 | 6/2008 | York | |
| 2009/0061749 | A1 * | 3/2009 | Sunderland | 451/438 |
| 2011/0016720 | A1 * | 1/2011 | Plaskett | 29/897.3 |

* cited by examiner

PORTABLE ADJUSTABLE CUTTING APPARATUS FOR CUTTING AND SHAPING SINK HOLES IN STONE COUNTERTOPS

CROSS REFERENCE TO RELATED APPLICATIONS

This application claims priority to U.S. Provisional patent application Ser. No. 61/627,798 filed Oct. 18, 2011 of like title and inventorship, the contents of each which are incorporated by reference in entirety.

BACKGROUND OF THE INVENTION

1. Field of the Invention

This invention pertains generally to the field of stoneworking, and more specifically to sawing, shaping and polishing of stone or similar material. Various specific manifestations of the invention include a portable tool mount which is configured to support and guide a saw, an abrading rotary disk tool, or other stoneworking equipment or tools; an edging apparatus for polishing stone edges and edges of other hard materials; and a contour rotary disk abrading tool provided with a member or a holder to facilitate the application of the tool to the workpiece, particularly in inside corners.

2. Description of the Related Art

Stoneworking is a very old art, dating back to the days of cave dwellers when man is presumed to have first taken shelter within a stone structure. However, the age of the art should not be confused with the level of technology in use today. The desirability of stone in the modern world for various monuments, markers, countertops and many other applications continues to be great owing to intrinsic hardness and resistance to the elements, a wonderful array of diverse natural and enhanced appearances, temperature resistance, thermal mass, low thermal expansion, and other desirable and unusual features. In addition to natural stone, synthetic or artificial stone, stone-containing materials, or stone-like materials are also being manufactured for desired characteristics. Consequently, much modern technology has been applied to further the provision of stone into the marketplace.

Natural stone is quarried in large blocks from mines and is normally next cut into thinner slabs. These slabs are polished on one surface and then typically sold into commercial or construction applications. Exemplary construction applications, though not by any means all-inclusive, are wall surfaces and decorations for both interior and exterior, trim, fireplaces, flooring, table tops, and counter tops. Rarely will the polished slab have the exact dimensions required for a given project. Consequently, the slab must be cut to fit the application. Depending upon the application, once the slab has been cut, the edge may additionally need to be finished, which may include leveling, shaping and polishing steps. Shaped and polished edges are typically created by grinding the surface with increasingly finer grits of abrasives. The abrasives are normally cooled with a fluid, typically water. As is known in the industry, the cutting, shaping and polishing operations release a large quantity of abrasive in the form of slurry and dust which can be quite detrimental to machines and equipment which are not designed to withstand the erosive environment.

Where large quantities of natural stone or stone-like materials are to be cut and polished, specialized equipment has been designed and constructed which facilitates the cutting and polishing operations. Many of these machines are designed to have enormous mass, which makes the tools much more rigid and also less susceptible to vibration and flexure that may otherwise occur. Most of these machines are further equipped with computer position control, such as through CNC programming or the like. Exemplary U.S. patents, the teachings and contents which are incorporated herein by reference, include U.S. Pat. No. 4,005,552 by Hoglund et al, entitled "Apparatus for improved control of a grinding machine"; U.S. Pat. No. 4,228,617 by Bando, entitled "Method for grinding glass plates and the like through numerical control and beveling machine therefor"; U.S. Pat. No. 5,409,417 by Bando, entitled "Numerically controlled grinding machine for plate glass"; U.S. Pat. No. 6,006,735 by Schlough et al, entitled "Automated stoneworking system and method"; U.S. Pat. No. 6,073,621 by Cetrangolo, entitled "Apparatus for automatic layout and cutting corner lines in stone"; and U.S. Pat. No. 6,315,799 by Toniolo, entitled "Automatic device for replacing grinding wheels in machines for profiling and polishing works obtained from slabs of marble, granite stone, glass, stoneware, cement and the like".

Other machines utilize very specialized technologies, such as extremely high pressure water jets carrying water and abrasive. Most of these machines are also equipped with computer position control, such as through CNC programming or the like. An exemplary U.S. patent, the teachings and contents which are incorporated herein by reference, is U.S. Pat. No. 6,155,245 by Zanzuri, entitled "Fluid jet cutting system and method".

While these tools are well suited for operations where stones may be readily transported to the machine, and particularly for higher volume production of identical stone geometries, they clearly have no utility for stones to be worked in situ at a construction location or the like. Furthermore, these machines tend to be extremely expensive, and so custom production on this type of machine results in undesirably large amounts of very expensive idle time. Not only do stones need to be changed for custom production, but the machine will also typically require reconfiguration and/or realignment for the custom job. Furthermore, the transport of a stone to and from a construction site to effect the custom work is not only expensive and the source of much delay, but the likelihood of an accident which destroys the stone is much greater with the additional transport. Finally, these large machines tend to be cost-prohibitive for a smaller shop that is not continuously using the machine.

In an attempt to provide a more portable machine, which may, for example, be used directly at a job site, other artisans have proposed various rail systems which are clamped or otherwise anchored to stone or other hard material, such as concrete or glass. These rails may act as guides, such as in the U.S. Pat. No. 2,014,229 by Emmons, entitled "Portable slab cutting machine"; U.S. Pat. No. 4,552,122 by Kelly, entitled "Portable apparatus for shaping glass by abrasion"; U.S. Pat. No. 5,960,780 by Harris, entitled "Lightweight stone cutting apparatus"; U.S. Pat. No. 6,062,122 by Niemczyk, entitled "Cutting guide system for portable power saws"; and U.S. Pat. No. 6,257,225 by Harris, entitled "Lightweight stone cutting apparatus"; the teachings and contents of each which are incorporated herein by reference, or may alternatively act as a track which supports a trolley or the like. Exemplary trolleys are shown in U.S. Pat. No. 2,291,058 by Pohl, entitled "Portable machine for cutting marble, ceramics, etc."; U.S. Pat. No. 2,592,001 by Bereit, entitled "Hydraulic moving, positioning, and holding mechanism"; U.S. Pat. No. 3,323,507 by Schuman, entitled "Concrete cutting machine"; U.S. Pat. No. 3,360,298 by Stoljarov et al, entitled "Stone-cutting machine with mobile carriage and tiltable saws"; U.S. Pat. No. 4,054,179 by Destree, entitled "Stone and concrete cutting machine"; U.S. Pat. No. 4,979,412 by Anders, entitled "Sawing machine"; U.S. Pat. No. 4,982,531 by Biebuyck, entitled "Method employing abrasive tools for the combined cutting and trimming of glass or crystal articles and an apparatus for carrying out the said method"; U.S. Pat. No. 5,482,026 by Russell, entitled "Precision abrasive saw"; and U.S. Pat. No. 5,588,418 by Holmes et al, entitled "Saw assembly with handle-actuated guide mechanism"; the teachings and contents of each which are incorporated herein by reference.

A number of artisans have also proposed various apparatus designed to work with a more portable disk-type circular saw blade, and have in many of these cases provided various apparatus for controlling or adjusting the height of the blade relative to the work. Exemplary U.S. patents, the teachings and contents which are incorporated herein by reference, include U.S. Pat. No. 1,230,696 by Filotico, entitled "Stone cutting machine"; U.S. Pat. No. 2,736,311 by Coates, entitled "Track mounted cutter for concrete slabs and the like"; U.S. Pat. No. 2,783,789 by Konway, entitled "Power driven circular saw"; U.S. Pat. No. 3,164,144 by Adams, Jr., entitled "Cutting apparatus"; U.S. Pat. No. 3,722,497 by Hiestand et al, entitled "Wall saw"; U.S. Pat. No. 3,763,845 by Hiestand et al, entitled "Wall saw assembly"; U.S. Pat. No. 3,988,125 by Ulsh, entitled "Power saw holder"; U.S. Pat. No. 4,055,160 by Wilson, entitled "Table saw"; U.S. Pat. No. 4,134,459 by Hotchen, entitled "Rotary cutting equipment"; U.S. Pat. No. 4,184,719 by Ward, entitled "Machine rails and carriages"; U.S. Pat. No. 4,817,581 by Trentadue, entitled "Adjustable support for cutting apparatus"; U.S. Pat. No. 4,998,775 by Hollifield, entitled "Apparatus for precision cutting of concrete surfaces"; U.S. Pat. No. 5,086,750 by Chiuminatta et al, entitled "Skid plate for concrete saw"; U.S. Pat. No. 5,429,420 by Johnson, entitled "Pavement cutting saw"; U.S. Pat. No. 5,666,939 by Chiuminatta et al, entitled "Soft concrete saw"; U.S. Pat. No. 5,669,371 by Rupprecht et al, entitled "Masonry slitting apparatus"; U.S. Pat. No. 5,676,126 by Rupprecht et al, entitled "Masonry slitting apparatus"; U.S. Pat. No. 5,921,228 by Watson, entitled "Multi-directional, self-propelled saw for cutting concrete slabs"; U.S. Pat. No. 5,941,227 by Bearden, entitled "Portable saw with disconnectable platform for cutting concrete for controlling cracks"; and U.S. Pat. No. 6,112,736 by Bearden, entitled "Portable saw with improved disconnectable platform for cutting concrete for controlling cracks".

For a single cutting operation, many of these devices have found utility in the industry, and rightly so. Providing a guiding edge for an abrasive saw or other cutter such as is used to cut stone and other hard materials is of much benefit for custom applications or the like as are frequently required at a building site. When a section of flooring or wall requires custom cutting and fitting, it is not always practical or reasonable to expect a stone factory to size the stone to the needs in advance. Moreover, it may not always be possible to accurately predict the dimensions owing to variability such as spacing between adjacent stone and the like. Furthermore, the thickness of adjacent stones may vary somewhat unpredictably, and the leveling of the intersection of the two stones may be a very important finishing operation.

Unfortunately, many of these devices are designed for only very light duty. Where guides are used, they tend to lack the necessary resistance to abrasion from the stoneworking dust, and consequently have a limited life only suited for very light duty stone working. These machines also illustrate single tool applications. So, when a stone mason identifies the need for a tool to assist with the guiding of a stone cutting saw, he must purchase a guide for his saw. Later, when he elects to purchase a guide for another stone working tool such as a polisher or an edger, he must then purchase another piece of equipment. This single function tool holding and guiding is not highly desirable, and so many masons will perform all but the most complex or sizeable jobs by hand. As is all too well known, when work is completed by hand, there is much greater risk that the mason will err in the process, and this error is not readily remediated in stone. Consequently, the probability for unsightly imperfections or total loss of valuable stone, and the additional work required to remake a destroyed piece or repair an imperfection provides much incentive in the industry for better tools to reduce the dependence upon hand operations. Additionally, the freehand shaping and polishing is very strenuous and time consuming.

In addition to the limitations aforementioned, another shortcoming of the prior art apparatus is the ability to guide and form inside openings and corners such as are typically found in the installation of a kitchen or bar sink within a stone counter top. In order to cut this type of hole with inside corners, it is most desirable to drop the saw vertically onto the stone to begin the cut in a predetermined place. Where the design of the cutting guide requires the saw to traverse from an end or edge of the stone, such a guide will have no applicability to the holes created for sinks. Moreover, adjacent to the sink the stone will frequently be rather narrow. Where this is the case, in the prior art a reinforcement bar has been inserted into a small groove cut into the stone. The reinforcement bar may then be pressed into the groove and typically adhesively secured therein. However, the cutting of the trough must also occur in the middle of the stone, and in this instance a wider than ordinary cutting blade is most desirable, in order to only require a single passage of the tool through the stone in the formation of the trough.

Most masons currently use a spinning type abrasive to cut a sink hole in a stone countertop. These abrasive cutters come in the shape of circular saw blades and drum shaped router bits. The two types of drum shaped router bits either cut with their abrasive grit on the side (radial) or with their bottom end (axial). A simple method of cutting a sink hole is for a mason to draw a line and use a grinder with a circular blade to follow the line to remove the waste material from the sink hole. There are two types of circular saw blades the mason can employ. First, there is a saw blade that is disc-shaped, like other traditional circular saw blades, that will lay flat on a planar surface. The mason will use this disc-shaped blade to make straight cuts. The second type of circular saw blade is a contour blade that has a concave side and a convex side. This blade will resemble the shape of a coffee cup saucer when laid on a planar surface with the concave side up. The contour blade will cut a much larger saw kerf than the thickness of the blade, which requires more power and consumes more abrasive. However, this blade shape also allows the mason to make a radius or curved cut. This contour blade was designed so that the concave side of the blade was normal to the inside radius of the cut. The blade can be mounted on a portable saw or angle grinder. The saw kerf from a concave blade on a portable saw with a horizontal shaft will leave a vertical profile on the waste side of the sink hole and create a bevel on the finished side of the countertop. Therefore the mason will use a drum type abrasive wheel to grind the bevel away to make the finished side of the stone's edge vertical. With the concave blade on an angle grinder the mason can hold the grinder at any angle to minimize the bevel on the finished side of the countertop. The mason will need to change their position to maintain a view of the cut line for each side of the sink hole and control the saw blade from over cutting or binding while keeping the cutting portion of blade vertical. This is much to accomplish and is prone for error. This is why a mason will position the blade a short distance from the waste side of the cut line. After the waste material of the sink hole is removed, they will use the drum type abrasives to grind the remaining waste material to the cut line. This freehand method will take great skill and can be very time consuming for the mason.

Another method for removing the waste material from a sink hole is for the mason to follow a template using a drum-shaped abrasive cutter called a finger bit. This finger bit is mounted on a router-type spindle motor with the shaft perpendicular to the stone surface. This spindle motor will follow the template either by utilizing a bearing or bushing attached directly to the spindle housing or using a bearing or bushing on the spindle shaft that is spinning the finger bit. The finger bits for the manual method will either cut the stone in one pass or multiple passes called incremental step cutting. The one pass method will cut the full thickness of the stone by utilizing the abrasive material on the side of the finger bit. This method will require the mason to push or pull the finger bit with great force through the stone. The incremental step cutting method will cut the stone by utilizing the bottom of the finger bit. This method will use the weight of the spindle and the force from a leadscrew to create the pressure to grind the kerf. With incremental step cutting, the finger bit is lowered into the stone with each pass around the template. This method can have an undesirable result when this groove gets deeper and less stone is available to support the down pressure. This down pressure will cause the finger bit to eventually break through the thin stone and create chips or voids on the finish side of the countertop.

Both styles of finger bits will need to have a diameter that will allow for enough abrasive material to have the proper surface speed to abrade the stone material and to have sufficient longevity to accomplish the job. The diameter of these finger bits will cut a much larger kerf than a saw blade and therefore require a larger spindle motor and more time to remove this extra waste material. Because of the nature of hard materials like stone, the mason who employs a finger bit to manually cut the stone will either need to use great force to pull the finger bit through the stone in one pass or spend substantial time and energy to incrementally step cut the stone by making 20 to 40 passes depending on the stone's thickness. The manual method of using a template allows the operator to remove the waste material of the sink hole in a method that is very consistent and error free. After the waste material is removed, the mason will grind back any areas where the finger bit paused leaving a slight gouge or in the case of incremental step cutting, removing the horizontal lines left by step cutting. This method of using a finger bit to follow a template gives the mason great control and requires much less skill. The disadvantage of using this method is the wide kerf creating the need to use a large spindle motor spinning and more rapidly consuming an expensive finger bit. Some exemplary U.S. patents and published patent applications illustrating finger bits and their use thereof, the teachings and contents which are incorporated herein by reference, include U.S. Pat. No. 5,274,963 by Tsur, entitled "Flush-mount sink assembly method"; U.S. Pat. No. 7,229,342 by York, entitled "Stone cutting system and method"; and 2008/0153399 by York, entitled "Stone cutting system and method".

As may be appreciated, there are many different styles and sizes of sinks utilized in the stone industry. Each model sink will have a specific shape that the manufacturer will recommend for the countertop cut out. These countertop cut outs will have straight areas and curved areas such a commonly found in a kitchen style sink. For bathroom style lavatories, the shape can commonly be a continuous curve like in a round or oval shape. While many masons rely entirely upon finger bits to cut these diverse openings, since finger bits are able to cut any geometry, it should be apparent that these bits cut a much wider kerf than a disc-shaped circular blade and so are slower and consume more energy and abrasive when cutting straight lines.

Several additional U.S. patents, the teachings and contents which are incorporated herein by reference, include U.S. Pat. No. 597,542 by Lorch, entitled "Polishing machine", which illustrates an adjustable polishing machine; and U.S. Pat. No. 6,263,866 by Tsao, entitled "Stone cutter" and U.S. Pat. No. 7,373,936 by Zagorouiko, entitled "Portable finishing apparatus for hard material", each which illustrate commercially available drive motors similar to that proposed in several of the present embodiments.

A number of additional U.S. patents and published applications illustrate various working tools, the teachings and contents which are incorporated herein by reference, including U.S. Pat. No. 136,432 by Gear, entitled "Machine for turning stone"; U.S. Pat. No. 561,367 by Badger, entitled "Method of and apparatus for dressing stone"; U.S. Pat. No. 1,971,297 by Donaldson, entitled "Shaping machine"; U.S. Pat. No. 2,020,709 by Walter, entitled "Grinding machine"; U.S. Pat. No. 2,075,369 by Stetler, entitled "Marble refacing machine"; U.S. Pat. No. 2,318,050 by Boynton, entitled "Cutting apparatus"; U.S. Pat. No. 2,787,871 by Le Clercq, entitled "Means and method of grinding polygonal articles"; U.S. Pat. No. 2,818,683 by Nieman et al, entitled "Glassware lathe"; U.S. Pat. No. 3,011,530 by Lamb, entitled "Guide for portable saw"; U.S. Pat. No. 3,396,713 by Schuman, entitled "Concrete saw guide and method of use thereof"; U.S. Pat. No. 3,903,658 by Daiuta, entitled "Mobile oscillating spot grinder with pressure control means to produce a feathering effect"; U.S. Pat. No. 4,058,280 by Clancy, entitled "Table rail"; U.S. Pat. No. 4,557,245 by Bieri, entitled "Concrete cutting or milling apparatus including a guide rail"; U.S. Pat. No. 4,836,494 by Johnsen, entitled "Device for mounting a rail or the like on a surface"; U.S. Pat. No. 4,986,252 by Holmes et al, entitled "Chain saw cutting assembly"; U.S. Pat. No. 4,989,372 by Avila et al, entitled "Precision radial arm saw for composite materials"; U.S. Pat. No. 5,035,061 by Bradbury et al, entitled "Guide for hand-held power tools"; U.S. Pat. No. 5,186,157 by Bieri, entitled "Guide and support structure for surface cutting apparatus"; U.S. Pat. No. 5,206,999 by Stone, entitled "Saw guide and surface protector"; U.S. Pat. No. 5,678,314 by Braunbach et al, entitled "Hand power tool"; U.S. Pat. No. 5,732,690 by Ogyu, entitled "Apparatus for cutting a stone member so as to have a curved surface"; U.S. Pat. No. 5,857,453 by Caven et al, entitled "Precision slot cutting machine for concrete and asphalt"; U.S. Pat. No. 5,947,103 by Saccon, entitled "Stone tile finishing system"; and 20110016720 by Plaskett, entitled "Rotary stone cutting tool and method".

The present inventor, in U.S. Pat. No. 6,712,061 by Kalb, entitled "Portable apparatus for working, shaping and polishing stone and other hard materials"; and U.S. Pat. No. 6,997,175 by Kalb, entitled "Portable apparatus for working, shaping and polishing stone and other hard materials", the teachings and contents which are incorporated herein by reference, discloses several portable tools, carriages and tracks that overcome many of the prior art deficiencies. Nevertheless, these apparatus fail to provide a fast and economical method and apparatus for forming a sink opening in stone.

What is desired then is a portable apparatus which enables a stone mason or worker of other hard material to purchase suitable apparatus which will perform the precise guiding of diverse tools across the hard material while allowing a mason at a job site to form precise inside holes, shapes and polished surfaces such as are found in the formation of a sink hole.

In addition to the foregoing documents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a portable apparatus for forming generally linear cuts in stone while following an inside edge of a sink template. The apparatus has a motor coupled with and operatively driving a horizontal spindle shaft. A disk-shaped saw blade is coupled to the horizontal spindle shaft. At least two flange wheels operatively roll and follow an inside edge of the sink template. A means is provided to operatively adjust the at least two flange wheels for different distances between the sink template and disk-shaped saw blade. A means is also provided to lift and hold said disk-shaped saw blade out of the stone so that the portable apparatus can be repositioned to prepare for a cut.

In a second manifestation, the invention is a portable apparatus for cutting inside corners and cutting oval and round sink holes cuts in stone while following an inside edge of a sink template. The apparatus has a motor coupled with and operatively driving a spindle shaft. A contour saw blade is coupled to the spindle shaft. At least two guide fences are located on distal sides of the spindle shaft and are adjustable to alter a distance between the contour saw blade and sink template, to operatively hold the contour saw blade an adjustable distance from the said sink template. A means to position and hold the spindle shaft at an angle relative to a surface of the stone can selectively and manually be varied so that the angle when the contour saw blade is at full depth into the stone will leave a finished side of the cut vertical and a waste material side beveled.

In a third manifestation, the invention is a portable apparatus for abrading portions of a stone sink hole where a desired cut line has a radius too small for a contour blade to reach and polishing said sink hole while following an inside edge of a sink template. The apparatus has a motor. A shaft perpendicular to a major surface of the said stone rotates under motive force provided by the motor. A drum abrasive rotates with the shaft. A rotating rub collar around the drum abrasive operatively follows the inside edge of the sink template. A pivoting arm supports the rotating rub collar and pivots with respect to the drum abrasive and thereby operatively changes a distance between the drum abrasive and sink template, whereby an operator may operatively adjust for different diameter drums and adjust as the drum abrasive diameter changes due to wear.

OBJECTS OF THE INVENTION

The present invention provides a portable system to cut the waste material from the sink hole on a stone countertop. The present invention allows the manual shop to use the faster cutting saw blades while being guided by a template. The present invention provides a method to efficiently use the proper saw blade for different areas of the sink, without the need for changing or relocating the template. The operator will use a standard flat disc style blade to make straight cuts and use a contour blade to make curved cuts. The curved cuts include the inside corners of square sinks and the curves on round and oval lavatory sinks.

Exemplary embodiments of the present invention solve inadequacies of the prior art by providing three separate apparatuses employed for this present invention, each which engage with a common prior art sink template.

The first apparatus has a motor with a flat or disk-shaped diamond saw blade on a horizontal spindle shaft. This apparatus is optimized to cut straight sections of the sink hole. The apparatus is guided by two flange wheels that will roll on the inside edge of the template. These two flange wheels can be re-adjusted for different distances between the template and the saw blade. This allows the operator to change the size of the countertop opening relative to the under-mounted sink while still using the same template. The apparatus also has the structure and flexibility to allow the operator to make plunge cuts or step cuts with great accuracy and ease. This apparatus has a gas filled cylinder to lift and hold the blade out of the stone so the saw apparatus can be repositioned for the next cut.

The second apparatus has a motor with a contour saw blade on a spindle shaft. This apparatus was designed to cut out inside corners and to cut out oval and round sinks. This apparatus has two guide fences on the left and right side of the blade's spindle shaft. These guide fences are adjustable to alter the distance between the blade and the template, to hold the saw blade an adjustable distance from the template. They also preferably have a certain length relative to the blade's diameter. The length of the fences controls how close the leading and trailing edges of the blade get to the template when making a curved cut. For a contour blade to make a vertical cut on an the inside corner of a sink opening, the spindle shaft of the motor will need to be held at an angle relative to the stone surface. Therefore the present invention was designed so the angle of the contour blade at full depth will leave the finished side of the cut vertical and the waste material side will have a bevel. The present invention can accomplish this in two different ways of operation by the mason. The first method is to make a plunging cut to remove the waste material from the inside corners of a square style sink and the second method is to step cut making several passes at greater depths to remove the waste from a circular style sink. The grinding motor and blade are held in the up position above the stone with two tension return springs. For the operator to lower the blade, they must over-power the return springs by squeezing two sets of handles on either side of the apparatus like a pliers. Using a squeeze type force allows the operator to maintain full control of the apparatus and not create an additional downward force on the weakened stone. The apparatus does this by attaching the motor bracket to the pivoting squeeze handles. The motor bracket carrying the grinder motor utilizes wheels rolling in grooves to plunge the blade in an arc motion into the stone. The blade plunging in this arc motion removes the least amount of material, therefore making the plunges faster. In the step cutting mode this arc shaped trajectory of the blade keeps the cut slightly back from the desired line until the final pass where the blade will be at full depth and in a vertical position to clean up any of the step cuts on the finished side of the saw kerf. To cut out an inside corner might typically require 4-5 plunges. For round and oval sinks the preferred method will typically be incremental step cutting. For step cutting, the blade height is held at the desired height for each pass by the use of a spring loaded ratchet mechanism. This ratchet mechanism has two modes of operation, where the pawl engages the stationary gear for step cutting and is disengaged for plunge cutting. Unlike the down pressure of a finger bit, a saw blade removes the material tangentially, therefore the operator can push the saw so that the stone feeds in a conventional type manner and this will prevent chip outs and voids in the bottom portion of the cut.

The third apparatus is an angle grinder type motor having a shaft perpendicular to the stone spinning a drum style abrasive. This apparatus is used to clean up any portions of the sink hole where the desired cut line had a radius that was too small for the contour blade to reach. The apparatus follows the same template as the above saws. The apparatus is guided by the template utilizing a rotating rub collar around the abrasive drum. The rotating rub collar is held within a pivoting arm that will change the distance between the abrasive drum and template. This feature will also allow the operator to adjust for different diameter drums and to readjust as the drum's diameter changes due to wear.

A first object of the invention is to provide a portable tool set for rapidly and efficiently cutting openings in stone and other hard materials, such as might be required for the installation of a sink. A second object of the invention is to greatly reduce the hand labor required to cut and finish a non-linear opening in a hard material. Another object of the present invention is to improve the precision and efficiency of cutting and polishing operations. A further object of the invention is the provision of tools which all follow a common prior art sink template. Yet another object of the present invention is to enable the tools to be adjusted relative to the template to control both the quality of the work and also to enable an operator to control the amount of reveal of the sink. A further object of the invention is to enable operator control of each tool from diverse locations about the tool, which is often required when forming a full circle or all sides of a sink cut-out. Yet another object of the present invention is to enable rapid tool changes between linear cutter, contour cutter, and abrasive drum. Yet a further object of the invention is to provide apparatus that moves freely in spite of debris on the work surface. Another object of the invention is to provide simple manual adjustment of tool elevation relative to stone. An additional object of the invention is to provide an apparatus that automatically adjusts for abrasive material lost from the cutter.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiments, the present invention provides three separate apparatuses, each which engage with a common prior art sink template to quickly and efficiently form a sink opening in a stone. For the purposes of the present disclosure, the material worked upon will be identified as stone. Nevertheless, for the purposes of the present disclosure it will also be understood that the present invention will also operate on other hard materials, including but not limited to glass, concrete, and other similar hard materials.

Figure 1A:
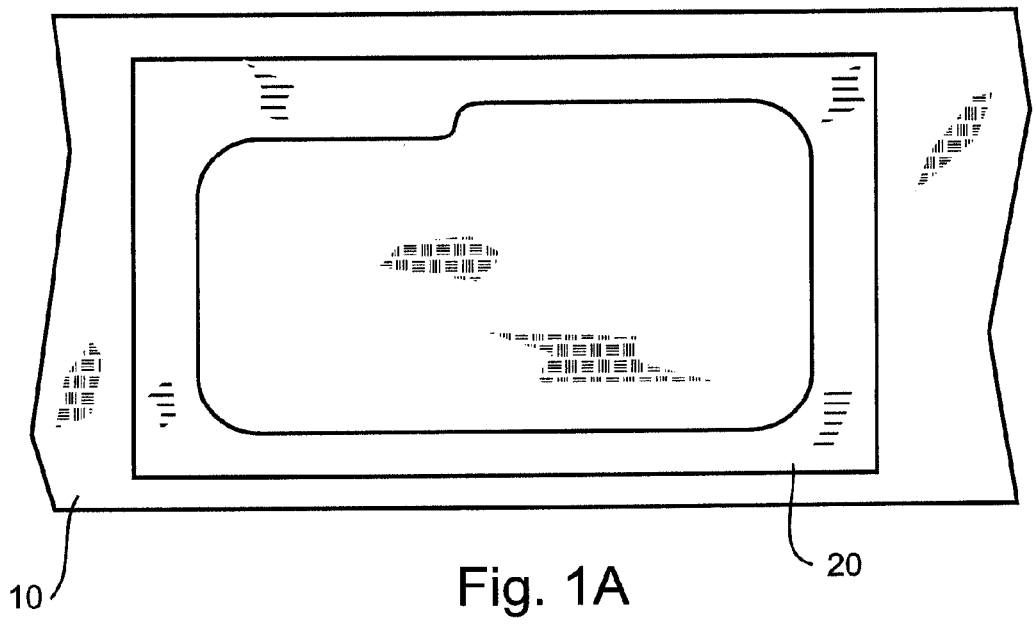
FIGS. 1A and 1B illustrate a prior art sink template placed on a stone in preparation for cutting a sink opening therein, from top and side views, respectively.
Figure 1B:
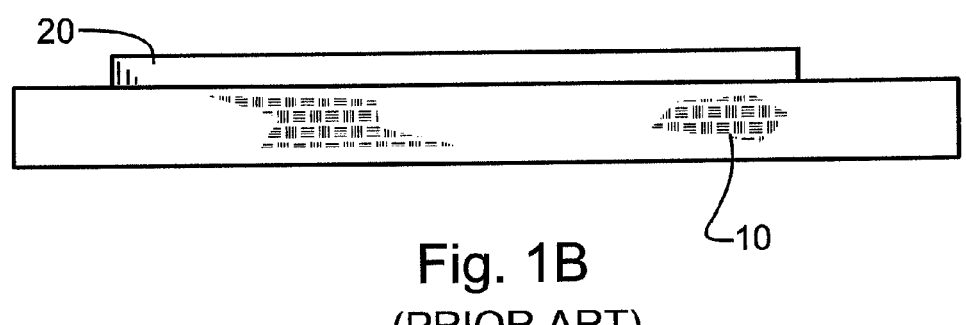

FIG. 1 illustrates a prior art stone 10 having a prior art template 20 affixed thereon. The method of affixing template 20 to stone 10 is not critical to the present invention, but for exemplary purposes might typically involve clamping. The geometry of stone 10 and template 20 is not critical to the present invention, and will vary by installation. Nevertheless, prior art template 20 is commonly provided or specified by a sink manufacturer, to assist with the proper cutting and installation of the sink. The materials used for template 20 are also not critical, but for exemplary purposes might typically be wood, plastic or combinations or laminates thereof.

When the template is placed in the desired location, the installer will also need to determine the amount of reveal desired. Reveal indicates how much of the sink will be visible within the countertop hole. Positive reveal means the top edge of the sink is visible within the sink hole, forming a small ridge or lip just within the hole perimeter. No reveal means the sink side walls line up with the countertop sink hole side walls, and none of the sink top edge is visible. Negative reveal means that the sink side walls are outside of the countertop sink hole side walls, meaning the countertop overhangs into the sink slightly. The particular amount of reveal desired is often determined by the purchaser and installer, and varies from individual to individual by preference.

Figure 2:
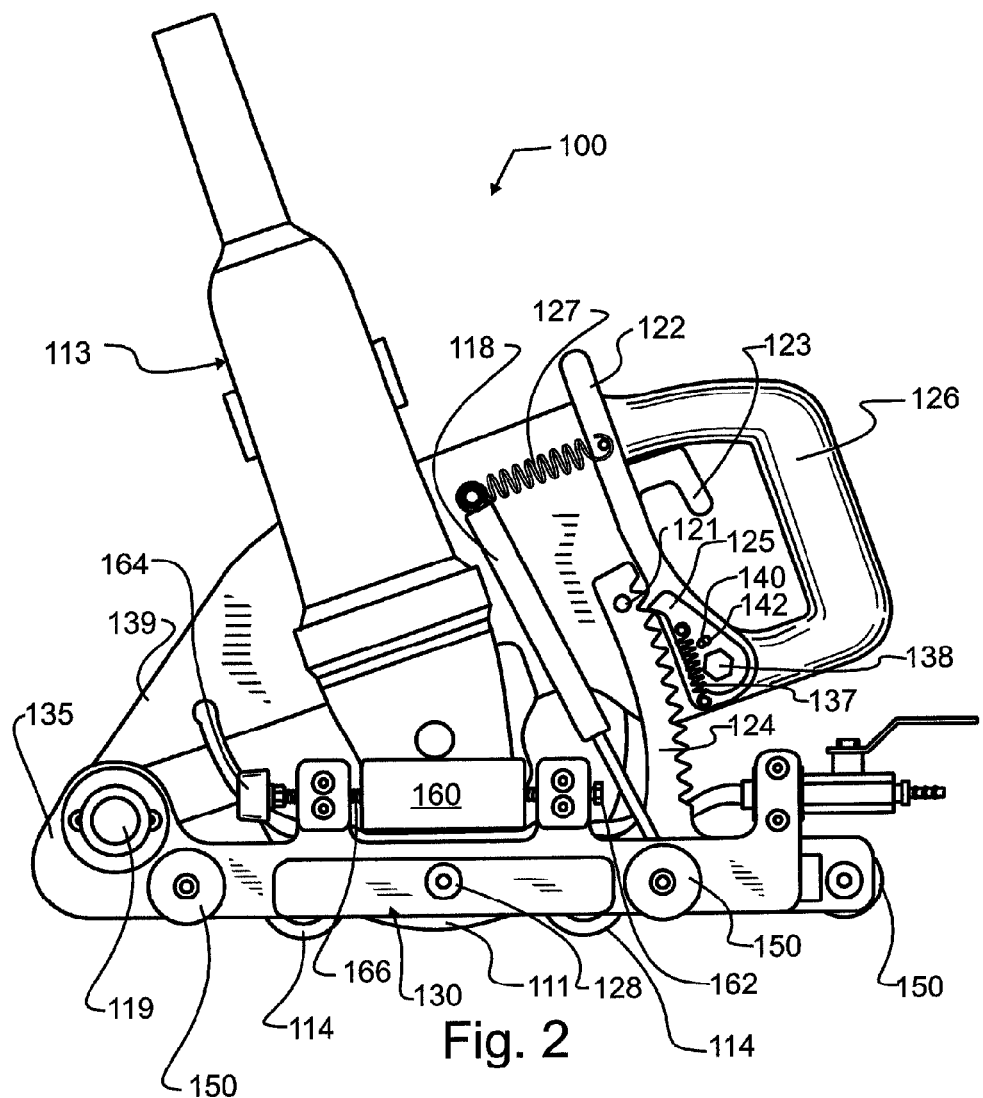
FIG. 2 illustrates a first preferred embodiment cutting apparatus designed in accord with the teachings of the present invention and having a disk-shaped standard circular saw blade from a back elevational view.
Figure 3:
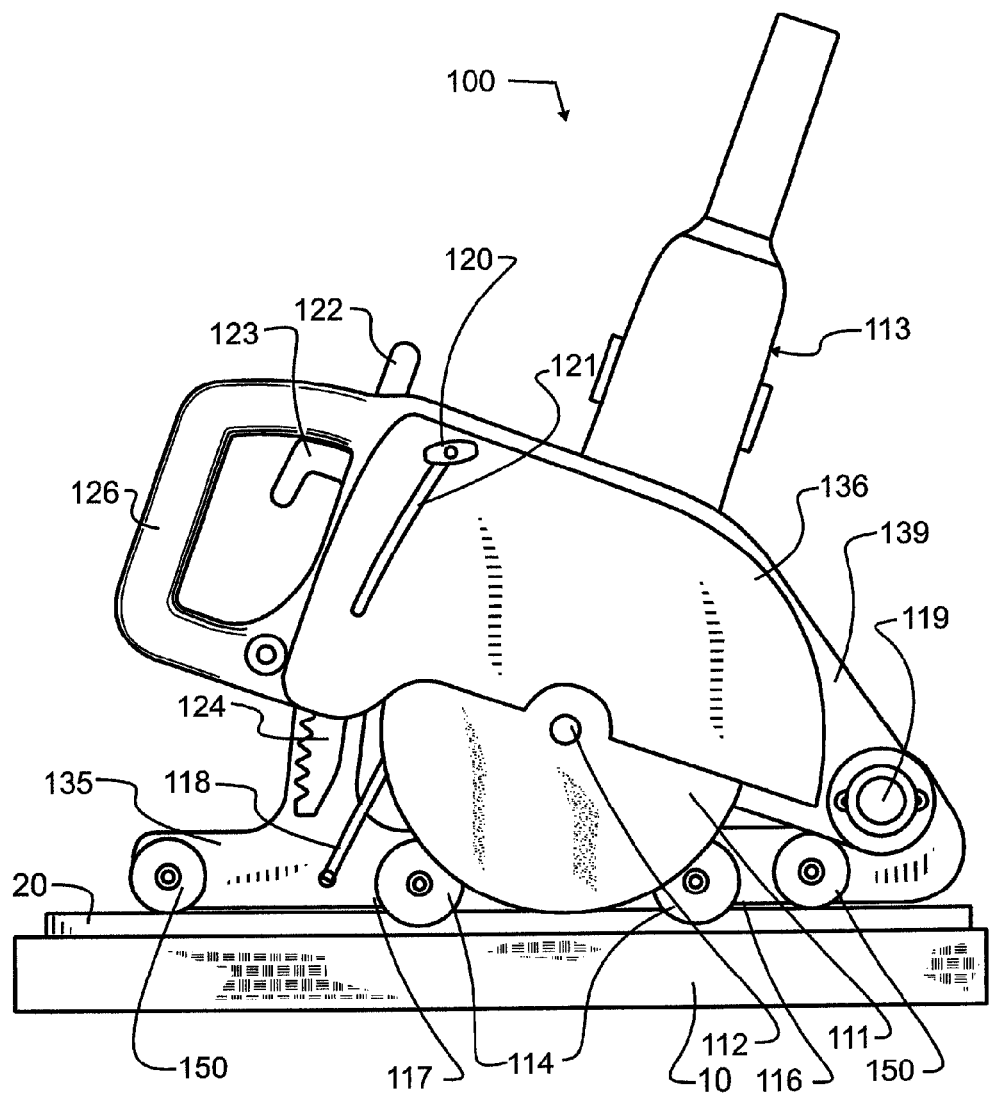
FIG. 3 illustrates the first preferred embodiment cutting apparatus of FIG. 1 from a front elevational view.
Figure 4:
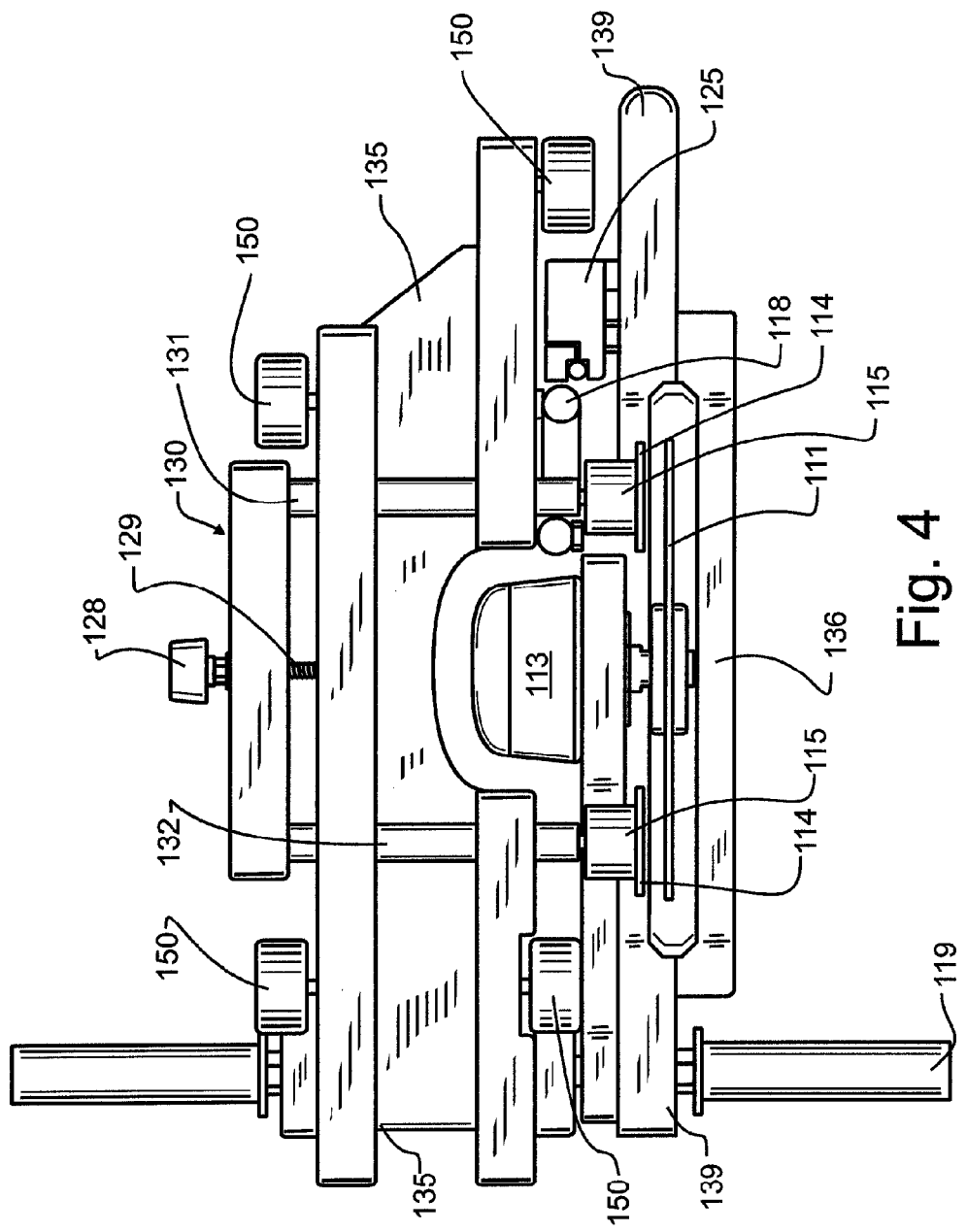
FIG. 4 illustrates the first preferred embodiment cutting apparatus of FIG. 1 from a bottom view.

The present invention incorporates three separate apparatus to cut a hole for a sink into the stone countertop 10, each using the same prior art template 20. FIGS. 2-4 illustrate a first preferred embodiment cutting apparatus designed in accord with the teachings of the present invention having a disk-shaped standard circular saw blade to cut the straight lines of a sink hole while being guided by the template. FIGS. 5-11 illustrate an apparatus that utilizes a contour blade for cutting out the inside corners and for cutting rounds and oval sinks while being guided by the template. FIGS. 17-20 illustrate a polishing apparatus utilizing a drum for removing any remaining material left behind from the sawing procedures, and optionally for performing particular cuts not otherwise possible.

The first preferred embodiment cutting apparatus 100 may for exemplary purposes use a standard diamond circular saw blade 111 shown in FIG. 1 attached to the spindle shaft 112 on a motor 113. FIG. 3 shows apparatus 100 on template 20 clamped to stone 10 in a ready-to-cut position. Apparatus 100 is placed on template 20 so that flanges 114 of flange wheels 115 are up against the inside edge of the opening in template 20. Flange wheels 115 are positioned on cutting apparatus 100 so that they define the leading edge 116 and trailing edge 117 of saw blade 111, when saw blade 111 is fully intruding into stone 10, at maximum cutting depth. The operator will position apparatus 100 so that the trailing flange wheel 115 is against the opening in template 20 and where the cut line begins to turn the corner. The operator will overcome gas spring 118 and plunge saw blade 111 into stone 10 by pushing down on saw handle 126, which in turn causes pivotal saw body 139 to pivot on shaft 119 relative to wheeled base 135. Saw depth is limited by sliding stop 120, which will bump against pin 121 coming from the side of the blade guard with gear tooth member 124. At the desired depth, the operator will push cutting apparatus 100 until the leading flange wheel 115 reaches the other end of the cut line where the template opening begins to turn the corner. The operator will then disengage ratchet pawl 125 by squeezing trigger 123 inside handle 126. This allows saw blade 111 to rise up out of stone 10. Motor 113 is mounted on pivotal saw body 139 that pivots on shaft 119 that is also attached to the wheeled base 135. Pivotal saw body 139 is urged into the uppermost position with a gas-charged cylinder 118 or a spring or other equivalent apparatus. Gas-charged cylinder 118 provides a holding force that keeps blade 111 out of stone 10, until the operator overpowers this spring-like force to lower blade 111 into stone 10.

When the operator overcomes gas-charged cylinder 118, blade 111 can be held at this lowered blade height by using ratchet-type pawl 125. Pawl 125 is coupled to handle 126 through spring 137 that urges pawl 125 into engagement with gear tooth member 124. The ratchet is preferably designed so that an operator can quickly lower and hold different blade 111 heights for step cutting while the operator is in a compromising position such as overreaching to make a cut that will be on different sides of the sink hole. A pivotal long ratchet pawl 122 pivots from the same ratchet pawl pivot 138 as ratchet pawl 125 and is pulled into engagement with gear teeth 124 by spring 127. Pawl 122 also rises above saw handle 126, which gives the operator access to release pawl 122 from gear teeth 124 when the operator is out of position to squeeze trigger 123 inside handle 126. A small pin 140 is rigidly anchored in long ratchet pawl 122 and passes through a short slot 142 in ratchet pawl 125. When pawl 122 is released, either by trigger 123 or from above, sufficiently from gear teeth 124 and continued to be further rotated, short slot 142 will run out of room and pin 140 will engage with ratchet pawl 125, causing ratchet pawl 125 to also follow and release from gear teeth 124. Consequently, with sufficient motion of either trigger 123 or pawl 122, the ratchet will disengage fully.

Cutting apparatus 100, as illustrated particularly in FIG. 4, has a blade spacing adjustment knob 128 that the operator can rotate to change the distance between template 20 and saw blade 111. Turning blade spacing adjustment knob 128 rotates a blade spacing adjustment leadscrew 129 which moves blade spacing adjustment member 130 and guide bars 131 and 132. Guide bars 131 and 132 are attached to the axles of flange wheels 115. Flange wheels 115 will consequently move closer or further away from the side of saw blade 111, depending upon the direction of rotation of blade spacing adjustment knob 128.

While not separately illustrated herein, it will be understood that flange 114 of flange wheel 115 is alternatively captured in a groove on a track that has a width similar to the thickness of the flange. With the flange being guided on both sides, this allows the operator more control of the saw. This tracking system gives this saw another purpose in that it can be used to make straight cuts and curved cuts with a limited radius.

In addition to flange wheels 115, and in alternative embodiments even potentially instead of flange wheels 115, cylindrical wheels 150 may be provided at any suitable locations to adequately support cutting apparatus 100 upon template 20. Softer and more resilient wheels are able to traverse small stone particles and other obstructions without changing the resulting cut, but at the same time softer wheels can permit some shift when abnormally large forces are applied thereto, such as when a saw blade binds or the like. Therefore, a designer must weigh the advantages of both softer and firmer wheels 115, 150, and may need to make some trade-offs for best utility.

When cutting large diameter rounds or sinks, cutting apparatus 100 with disk-shaped circular saw blade 111 may be faster and more efficient at making the cut than with contour saw blades or abrasive drums. In such instance, and as illustrated in FIG. 2, an arcuate guide bar 160 can be fastened to wheeled base 135 through arcuate guide bar fixed pin support 162 on a first side and arcuate guide bar holding screw 166 opposed thereto. Arcuate guide bar holding screw knob 164 is rotated to tighten or clamp down on arcuate guide bar 160. At some distance along arcuate guide bar 160 and spaced from or distal to wheeled base 135, arcuate guide bar 160 can be pinned or pivotally affixed to an arc center point. This could be by nailing, a pin passing through a hole in bar 160, or any other suitable means. Arcuate guide bar 160 will then define a radius between the center point anchor and wheeled base 135, fixing the travel to an arc of that diameter similar to a compass.

The second preferred embodiment cutting apparatus 200 is designed to spin a contour saw blade 211. The contour saw blade is designed to cut curves, because of its shape, having a concave side and convex side and thereby resembling either a saucer or a funnel. To take advantage of the blade's shape the operator will position the blade so that the concave side of the blade is towards the inner radius of the curve. Ideally the operator should use the contour blade at an angle so that the finished side of the cut is vertical and the waste side has a bevel.

Figure 5:
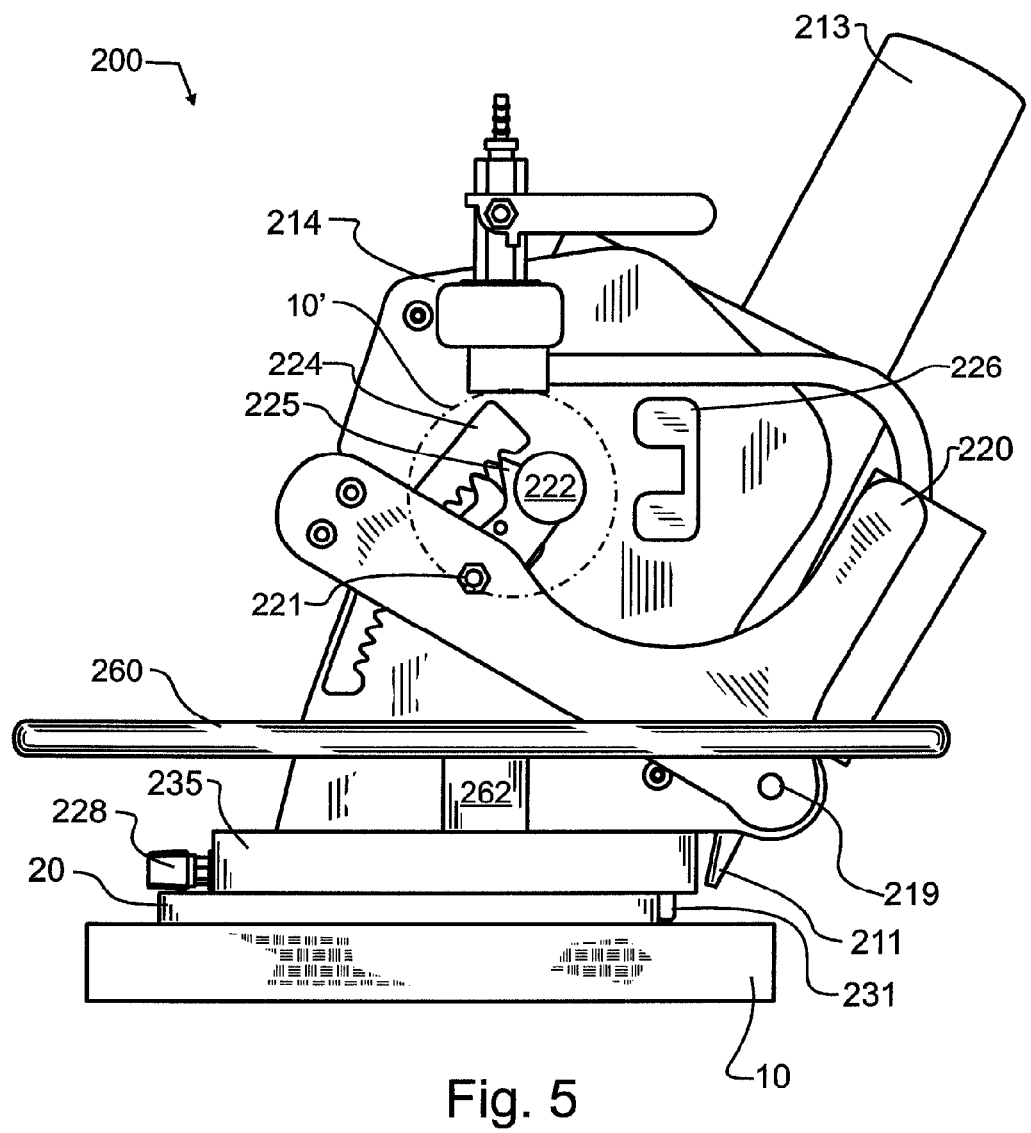
FIG. 5 illustrates a second preferred embodiment cutting apparatus designed in accord with the teachings of the present invention and having a contour saw blade from a side elevational view.
Figure 7:
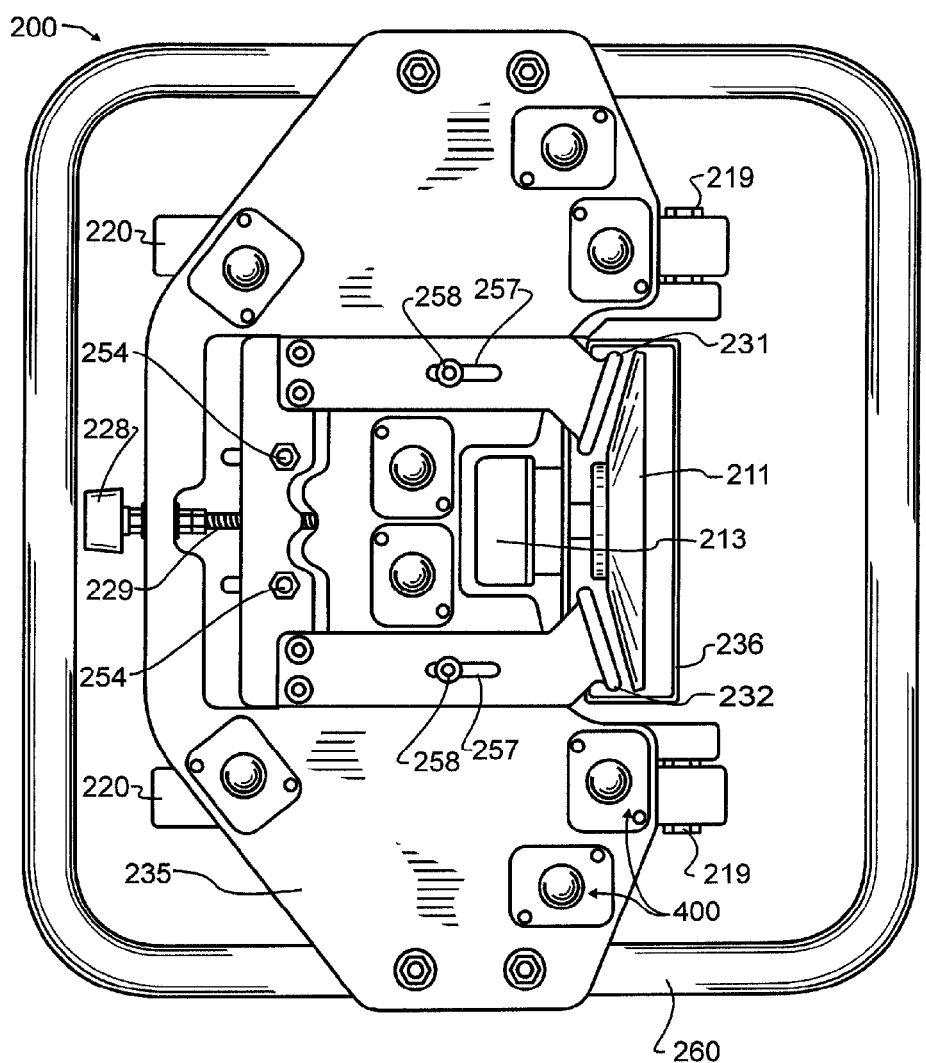
FIG. 7 illustrates the second preferred embodiment cutting apparatus of FIG. 5 from a bottom view.
Figure 8:
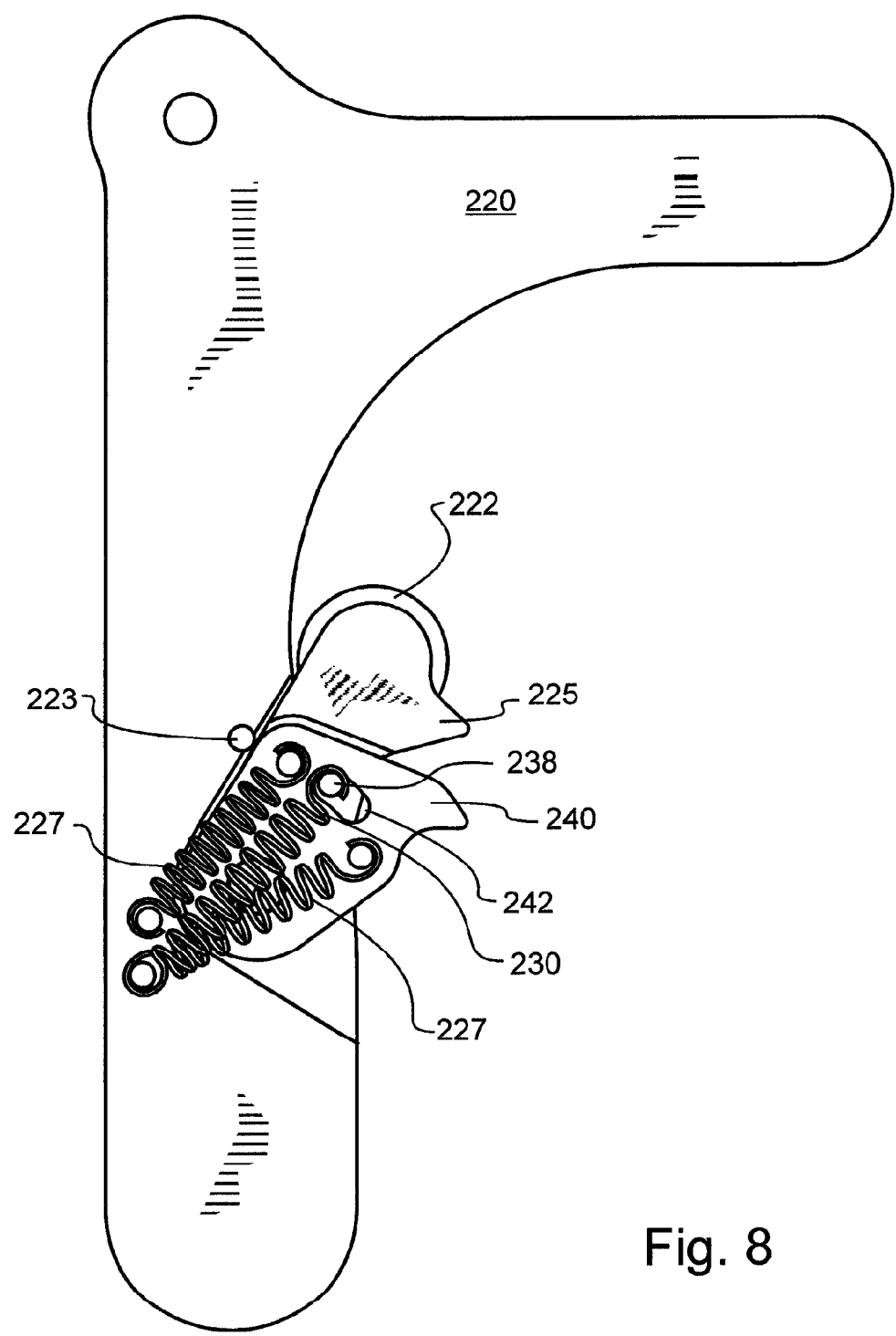
FIGS. 8 and 9 illustrate a preferred over-center pawl apparatus used in the second preferred embodiment cutting apparatus of FIG. 5 to control abrasive blade height from a side view and with the pawl in two alternative positions.

In FIG. 5, the illustration shows preferred embodiment cutting apparatus 200 with a contour blade 211. Cutting apparatus 200 is placed on template 20 that is clamped to stone 10. Template 20 has an opening that is slightly larger than the desired opening for the sink Two guide fences 231, 232 are below rolling base 235 and are used to rub against the inside opening of the template 20 to guide blade 211. In FIG. 7, the illustration shows the bottom of rolling base 235 and how the length of the guide fences 231, 232 will limit the leading and trailing ends of the saw blade 211. The distance between the fence and the blade can be adjusted by turning knob 228 attached to leadscrew 229. The rotation of leadscrew 229 will change the distance of guide fences 231, 232 relative to blade 211. This will allow the operator to adjust the size and associated reveal of the sink hole while using the same template. At least one, and preferably a pair of guide fence locking knob and bolt combinations 254 are provided that run in slots 256 formed in rolling base 235. Similar guide pins 258 keep guide fences 231, 232 in proper alignment in combination with guide slots 257.

Figure 6:
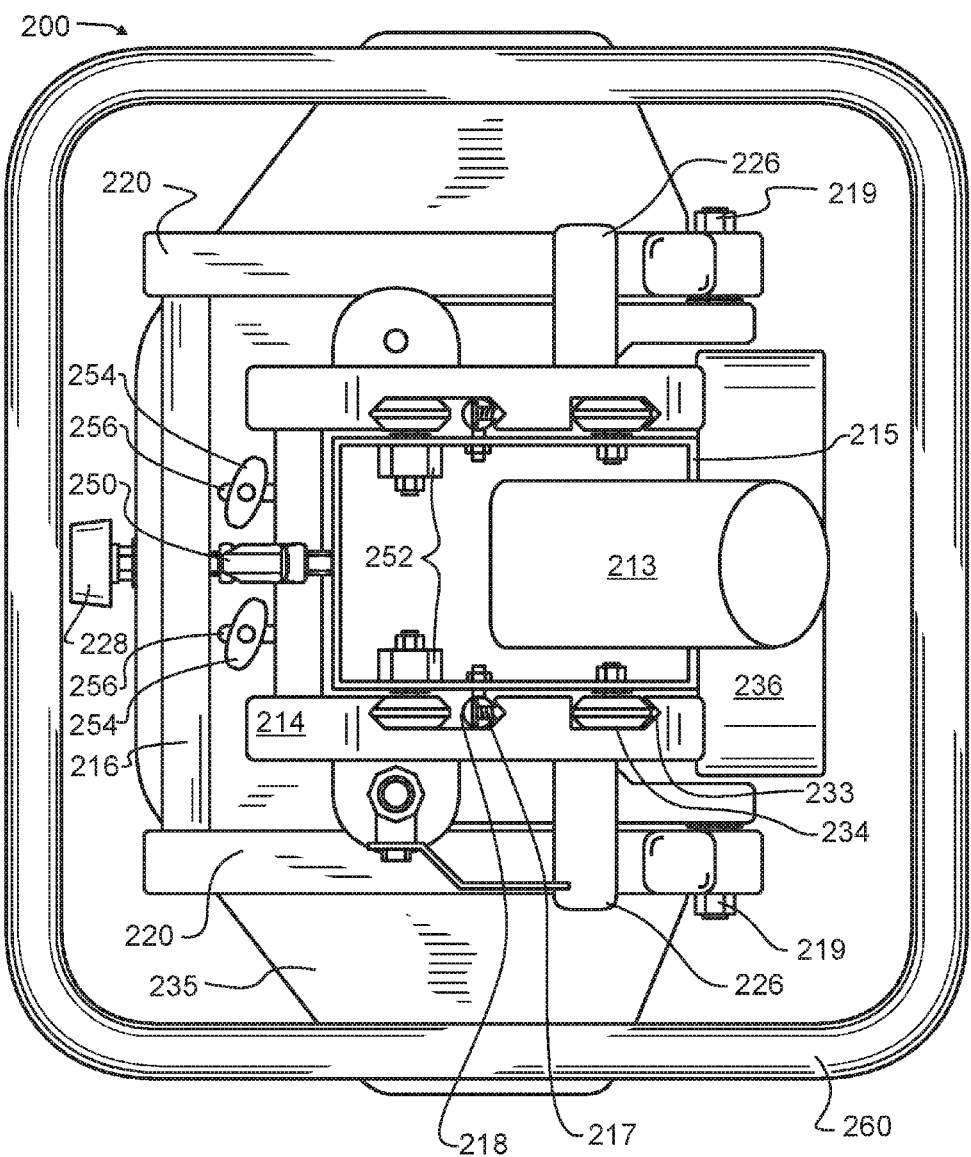
FIG. 6 illustrates the second preferred embodiment cutting apparatus of FIG. 5 from a top plan view.

The side of preferred cutting apparatus 200 illustrated in FIG. 5 includes a fixed handle 226 and an operable lever handle 220 that rotates about a pivot 219. This same configuration is repeated on the opposed side of cutting apparatus 200. The end of lever handle 220 opposite of pivot 219 is connected to a cross bar 216 visible in FIG. 6, which is also connected to the other side's lever handle. Cross bar 216 moves in an arc-shaped trajectory relative to pivots 219 and is connected to motor bracket 215 that houses grinder motor 213. Motor bracket 215 has two pre-loaded tension springs 218 that extend between a screw anchor 217 anchored into side track 214 and motor bracket 215, to hold the motor up so that saw blade 211 is not engaged with stone 10. The operator will lower contour saw blade 211 by rotating lever handles 220. This is accomplished by the operator placing open hands between fixed handles 226 and lever handles 220 on either side of the apparatus. By closing their hands, the operator will shorten the distance between lever handles 220 and fixed handles 226. Lever handles 220 will rotate about pivots 219 and will lower cross bar 216. Cross bar 216, visible in FIG. 6, is coupled to motor bracket 215 through lever and bracket coupler 250, also visible in FIG. 6. Rotating lever handles 220 will consequently pull motor bracket 215 down, thereby engaging blade 211 into stone 10. Other alternatives are contemplated herein to accomplish this task to lower contour blade 211 into stone 10, including: a single lever handle rather than two handles, a torsion compression spring, a lever arm for example like a miter box, a gear and gear rack mechanism, a chain and sprocket, a lead screw and a pneumatic or hydraulic type cylinder. All of these are within the nature and scope of the present invention. Other alternatives are also considered for lifting the blade and motor assembly including a torsion, compression and pneumatic or hydraulic type cylinder.

Figures 9, 10, 11:
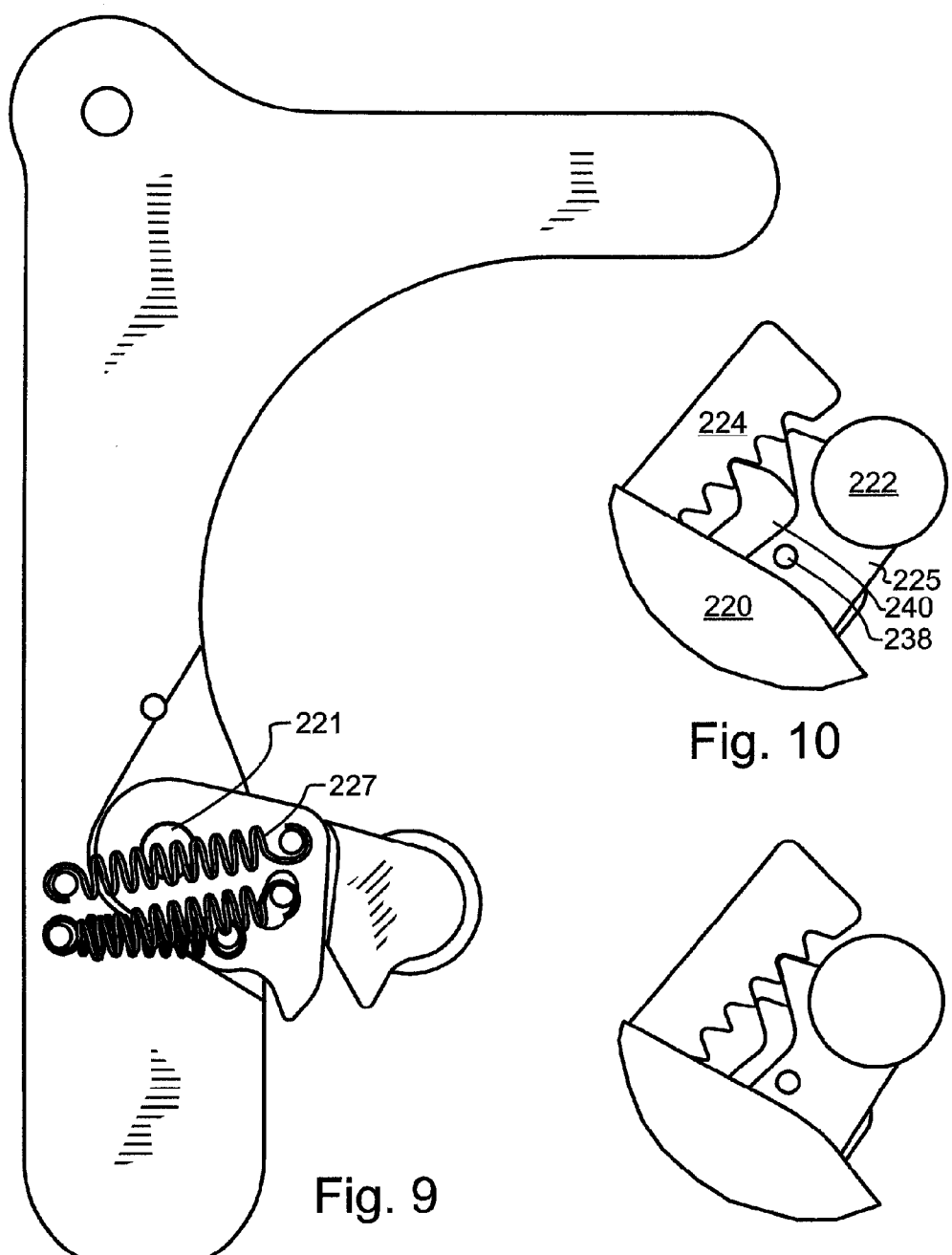
FIGS. 10 and 11 illustrate the preferred over-center pawl apparatus of FIGS. 8 and 9 in further combination with the curved gear tooth rack as used in the second preferred embodiment cutting apparatus of FIG. 5 from an enlarged view taken along section line 10' of FIG. 5 and showing progression of the pawl apparatus in two alternative positions along the curved gear tooth rack.

Preferred embodiment cutting apparatus 200 as visible in FIGS. 5 and 8-11 illustrates a ratchet mechanism that is used to hold contour blade 211 at a desired depth. This ratchet mechanism consists of a large pawl 225, a small pawl 240 nested with large pawl 225, a knob 222 to rotate pawl 225, a curved gear tooth rack 224 that large pawl 225 and small pawl 240 alternately engage with, a pair of tension springs 227 coupled between lever handle 220 and small pawl 240, a tension spring 230 coupled between lever handle 220 and large pawl 225, and a pin 223 to limit the range of movement of pawls 225, 240. In addition, a follower pin 238 running in a slot 242 of small pawl 240 causes small pawl 240 and large pawl 225 to track together beyond a small and limited range of rotation. The alternating engagement of pawls 225, 240 with gear tooth rack 224 is illustrated in FIGS. 10 and 11, and allows for a finer height adjustment while still using coarse gear teeth that are more resistant to wear and debris.

Pawls 225, 240 each rotate about a pivot 221 on lever handle 220. The pair of tension springs 227 gives the pawls two modes of operation. The first mode is to engage the pawls 225, 240 with gear rack 224. This is the position illustrated in FIGS. 9-11. Notice from FIG. 9 that springs 227 both pass below pivot 221, causing the pawls to press against gear rack 224. The tension spring is used to pull the pawls so that they automatically mesh with gear rack 224 and prevent lever handle 220 from rotating up. This in turn holds the desired depth of blade 211. The second mode is for tension springs 227 to hold pawls 225, 240 away from gear rack 224. Rotating the pawl knob 222 clockwise about pivot 221 as viewed from FIG. 5 into the position illustrated in FIG. 8 will rotate pawls 225, 240 away from gear rack 224. At first this causes each of the tension springs 227, 230 to lengthen, until the springs pass gets beyond pivot 221. At this point the springs will begin to shorten and hold the pawls against limit pin 223 thereby disengaging the pawls. As may be apparent, since the springs 227, 230 are at maximum extension between the two modes, the pawls are bistable, being stable in either mode but not between. This creates an "over-center" effect, whereby movement to the full spring extension will carry on until the travel limit is reached in one of the two stable modes. Other alternatives to perform this task are contemplated herein, including a multi-stepped cam, a friction type clamp, a spring loaded ball detent, a spring loaded pin mechanism and a one way clutch. All of these are within the nature and scope of the present invention.

FIG. 6 illustrates from above motor bracket 215 and side tracks 214. These are provided to create an intended trajectory of motor bracket 215 during use. Eccentric nut adjusters 252 are provided to ensure that v-shaped wheels 234 are snugly pressing opposed walls within v-shaped grooved tracks 233 to avoid undesirable free play. The preferred embodiment apparatus 200 moves motor 213 and blade 211 descending through an arc-type path. This path ends with contour blade 211 positioned so the convex side of the blade is cutting vertically and on the finished side of the cut. This arced trajectory was calculated so that plunging blade 211 into stone 10 would create the least resistance. This trajectory is based on the shape of contour blade 211. This allows the operator to plunge blade 211 into stone 10 without moving apparatus 200 or binding blade 211. The preferred design of the side tracks 214 found in the present invention utilizes v-shaped wheels 234 and v-shaped grooved tracks 233 operative in the same ways as those illustrated by the present inventor in U.S. Pat. Nos. 6,712,069 and 6,997,175, the contents and teachings which were incorporated by reference herein above. This is a reliable method to create a trajectory for a motor bracket carrying the grinder motor and blade. This design utilizes radial bearings in v-shaped wheels for rolling on surfaces to create the motion that will not bind or lock up due to debris from the stone slurry. Other alternatives were considered to control the trajectory of the saw blade into the stone including linear bearing on round ways, rollers on square ways, and sliding bearing blocks on keyways. All of these are within the nature and scope of the present invention. The present invention also contemplates a linear vertical trajectory for plunging contour blade 211 or other types of saw blades including but not limited to saw blade 111. This is less desirable due to the shape of the blade which leads to more waste material being removed. Additionally, the pan of the blade interferes with the plunging cut, thus making a slower plunge cycle. FIG. 6 also illustrates return spring 218 from a top view that lifts motor assembly 215 with contour blade 211 out of stone 10. Return spring 218 is anchored in the top of side track 214 with a screw 217 fastened into side track 214 or other suitable means. The other end of the return spring is anchored on the side of motor bracket 215.

An optional but preferable blade guard 236 is visible in FIGS. 6 and 7 to prevent undesirable expulsion of debris and slurry. An optional but preferable multi-directional handle 260 is also provided that wraps about preferred embodiment cutting apparatus 200, allowing the operator to move and direct preferred embodiment cutting apparatus 200 from any direction. A handle mount 262 couples multi-directional handle 260 to and above rolling base 235.

Figure 12:
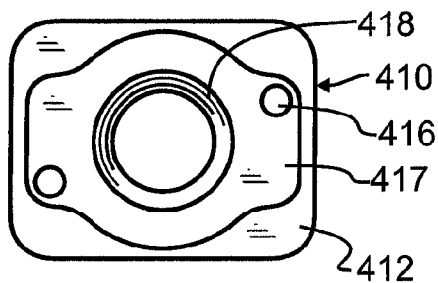
FIGS. 12 and 13 illustrate a preferred roller cover from top and bottom plan views, respectively.
Figure 13:
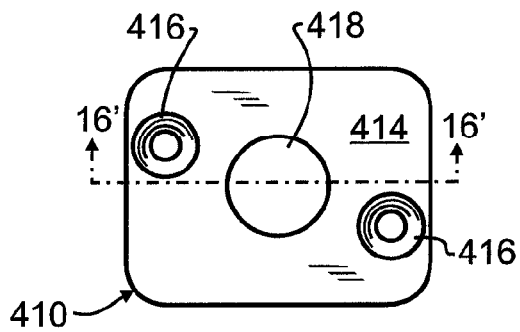
Figure 14:
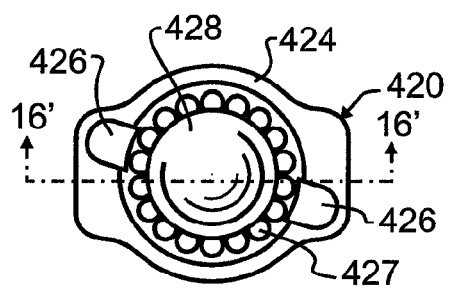
FIG. 14 illustrates a preferred bearing cup having a main roller and bearings therein from a bottom plan view.
Figure 15:
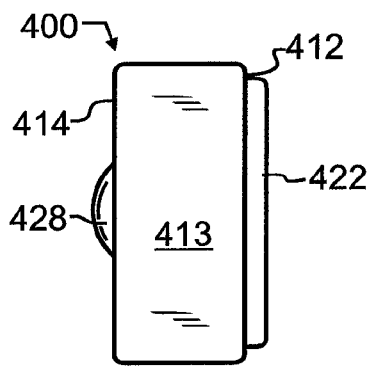
FIG. 15 illustrates a preferred ball roller having the preferred roller cover of FIGS. 12 and 13 combined with the preferred bearing cup of FIG. 14 from a side view.
Figure 16:
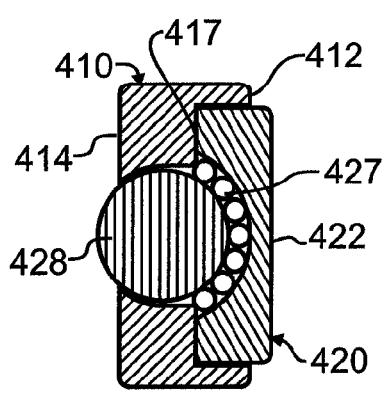
FIG. 16 illustrates the preferred ball roller of FIG. 15 from a sectional view taken along line 16' of FIG. 13.
Figure 17:
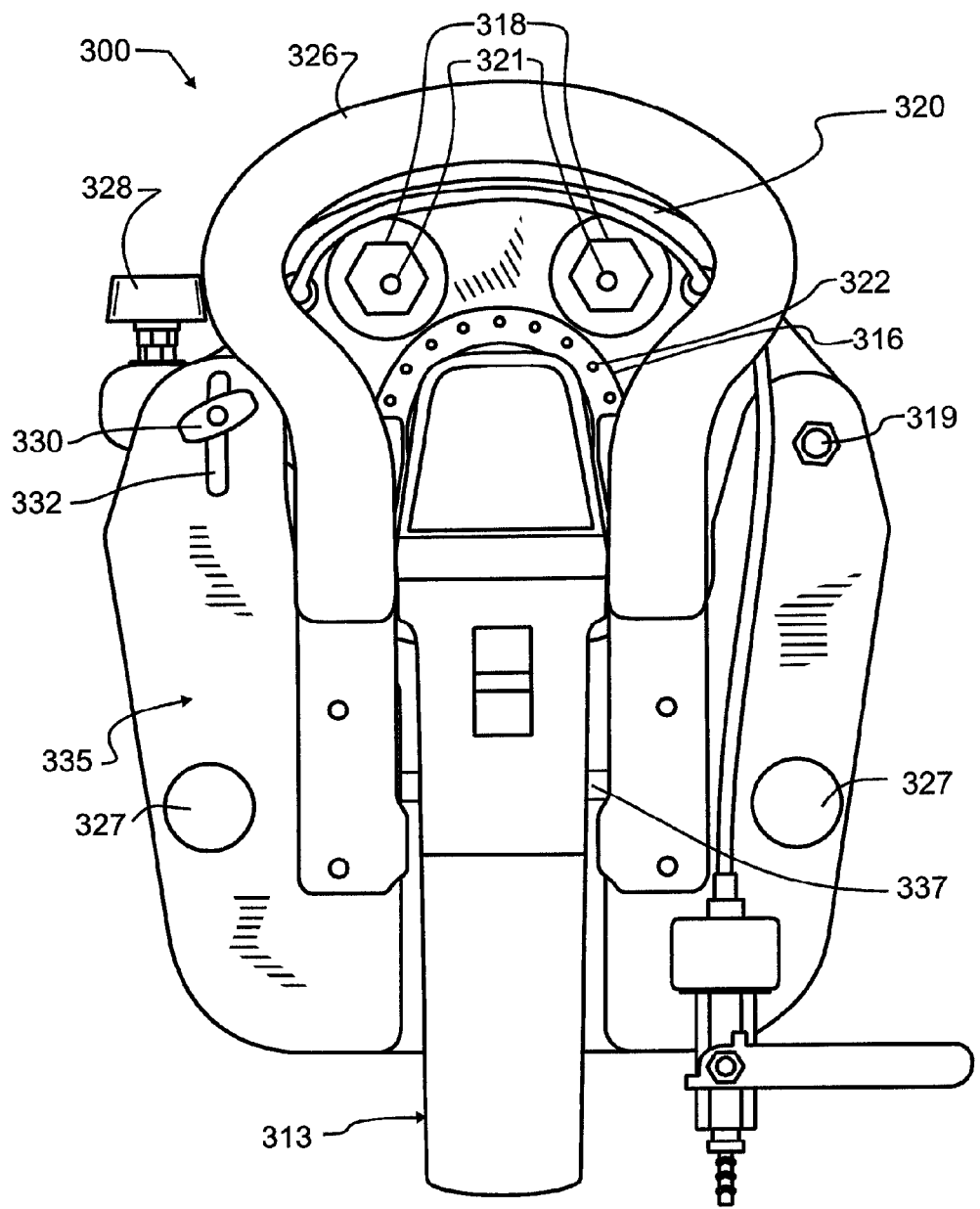
FIG. 17 illustrates a first preferred embodiment polishing apparatus designed in accord with the teachings of the present invention and having an abrasive drum from a top view.

FIGS. 12-16 illustrate a preferred ball roller 400 such as is used in the preferred embodiment cutting apparatus 200 and polishing apparatus 300. Roller cover 410 has a cover back 412, cover side 413, and cover front 414. Visible in FIG. 12 is a bearing cup cavity 417 for receiving bearing cup 420 therein. At least one, and preferably a pair of debris clean-out ports 416 are provided that allow fluid to be injected into, and preferably removed from, the bearing cup region to flush out small debris that might be picked up by the main roller ball 428, which is exposed through main roller ball opening 418. Bearing cup 420 has a bearing cup back 422, bearing cup front 424 and bearing cup clean-out grooves 426 that provide a guided flow channel for cleaning fluid passing through clean-out ports 416. Supporting main roller ball 428 in bearing cup 420 are a plurality of smaller roller bearings 427. Ball roller 400 enables multi-directional motion over a debris covered surface, while offering ready cleaning to aid in the life-expectancy of ball roller 400.

Figure 18:
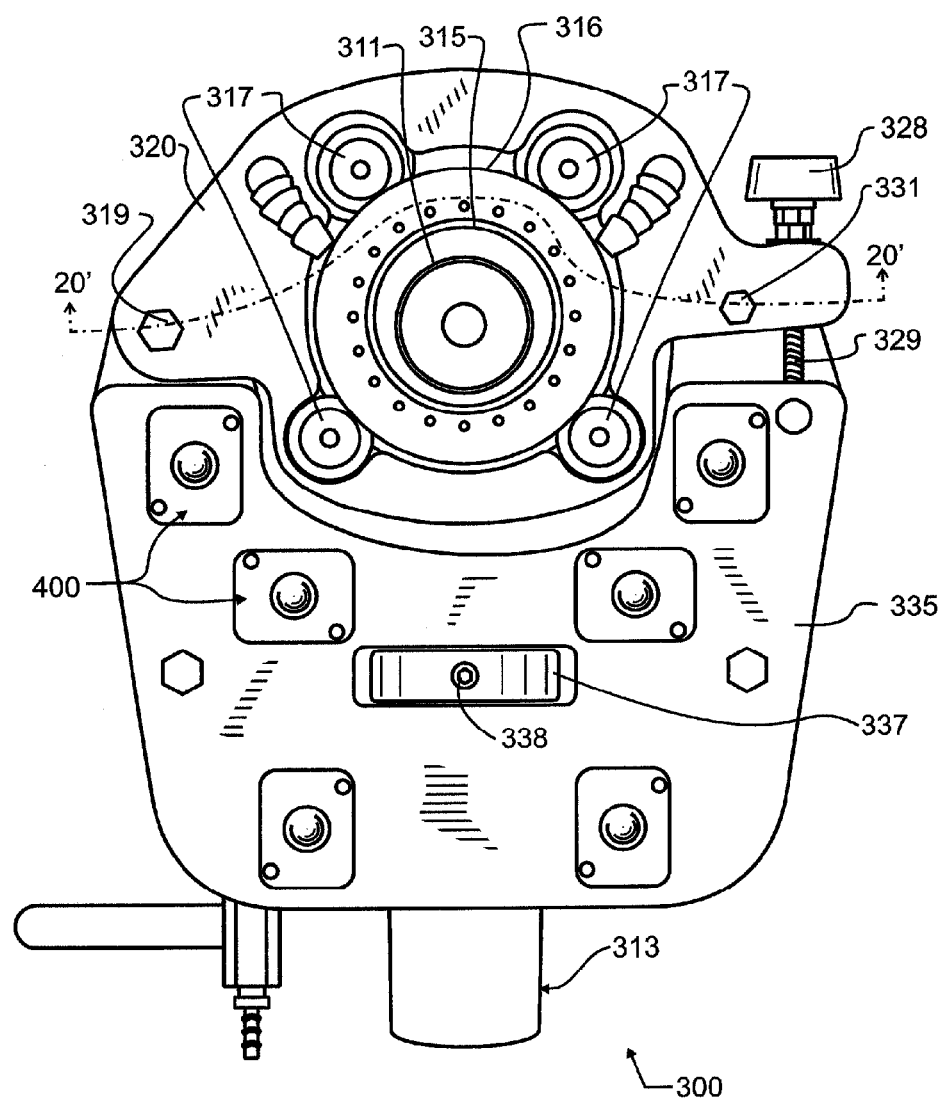
FIG. 18 illustrates the first preferred embodiment polishing apparatus of FIG. 17 from a bottom view.
Figure 19:
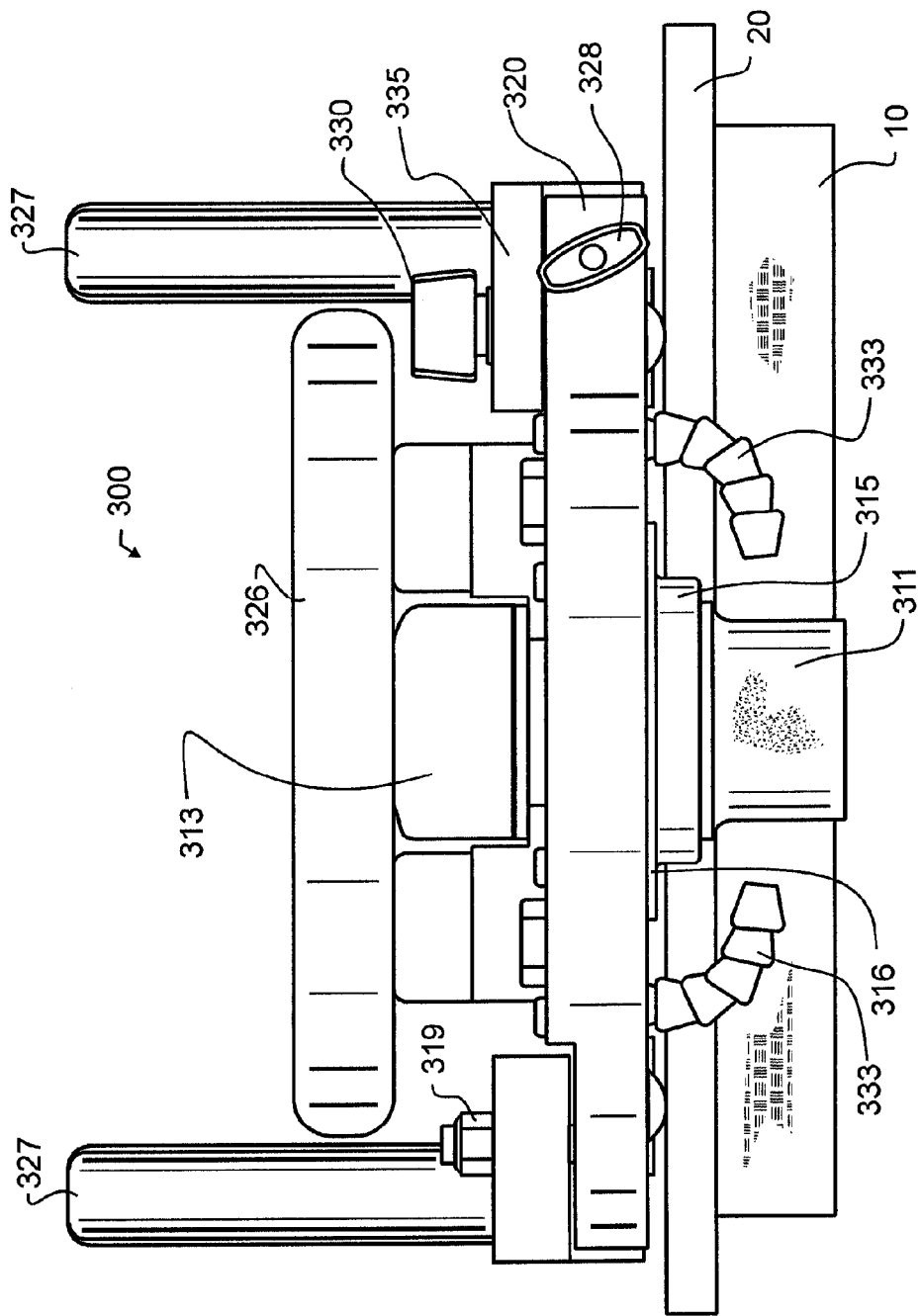
FIG. 19 illustrates the first preferred embodiment polishing apparatus of FIG. 17 from a front view.
Figure 20:
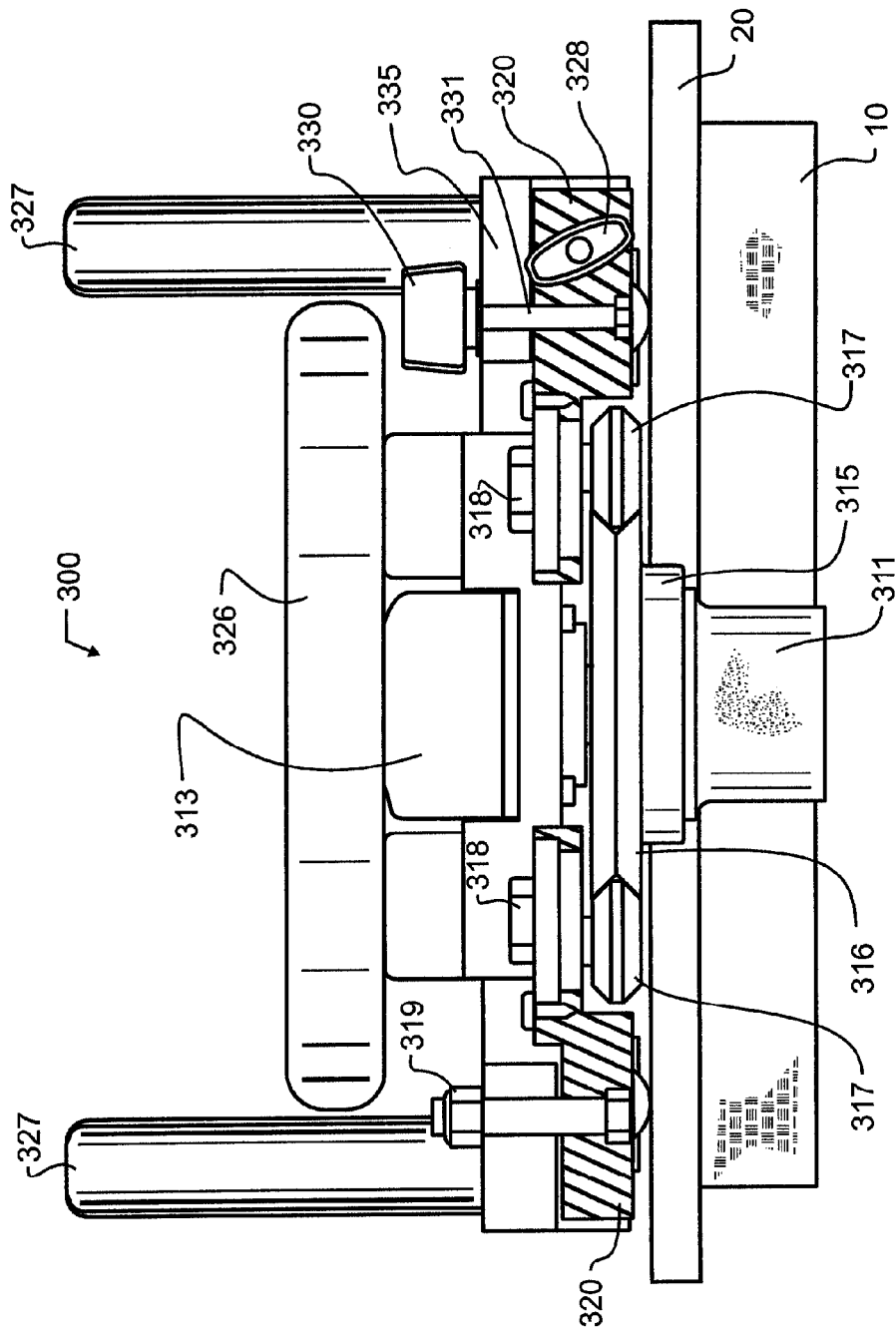
FIG. 20 illustrates the first preferred embodiment polishing apparatus of FIG. 17 from a front view similar to that of FIG. 19, but with the swing arm sectioned along line 20' of FIG. 18.

FIGS. 17-20 illustrates a first preferred embodiment polishing apparatus 300 designed in accord with the teachings of the present invention that uses an abrasive drum 311 for material removal and polishing. Like the previous apparatuses 100,200, apparatus 300 is placed on template 20 that is clamped to stone 10. As already noted, template 20 has an opening that is slightly larger than the desired opening for the sink. FIG. 18 shows that rotating collar 315 preferably has a groove 316 that is captured by radial bearings 317, which allows collar 315 to rotate when positioned against template 20. To ensure a snug fit there between, one or more of the radial bearing axles 321 are preferably carried within eccentric bearing supports 318, such that rotation of the eccentric bearing supports can control the force between radial bearings and groove 316.

Radial bearings 317 are attached to a swing arm 320 that rotates about pivot 319 relative to base 335 that is carrying grinder motor 313. On the other side of swing arm 320 is a knob 328 attached to a lead screw 329 that allows the operator to adjust for the desired distance between the template and the sink opening. This distance will also need to be readjusted as the abrasive drum's diameter changes due to wear. A coarse lead screw 329 may preferably be used, for better durability and to reduce the likelihood of binding due to debris. Nevertheless, significant rotations of lead screw 329 will still make very fine micro-adjustments to the distance between abrasive drum 311 and template 20. Where desired, additional securing may be achieved by the provision of pivot lock knob 330, pivot lock bolt 331, and pivot lock guide slot 332 that can help to secure swing arm 320 in a desired position.

Since rotating collar 315 is supported upon bearings and free to rotate relative to abrasive drum 311, the collar does not mar, gouge or wear the template in the way a traditional spinning rub bearing will. This is particularly noteworthy in the case of wood templates, since the wood will normally be water soaked from the water spray outlets 333 during operation and can become relatively soft.

Most preferably, rotating collar 315 also will preferably have one or more rotation indicators 322 that are visible to an operator. When the collar begins to rotate, owing to contact with the template, the operator will know that the area being worked is either finished or the knob 328 will need to be readjusted to compensate for tool wear.

To facilitate handling by the operator, one or more of the horseshoe-shaped handle 326 and vertical handles 327 are preferably provided and extend from base 335. A way to fasten the grinder motor 313 to base 335 will preferably be provided, and in the preferred embodiment 300 this is achieved with tool cradle 337 and tool fastener 338.

Further contemplated herein is the use of this preferred embodiment polishing apparatus 300 having rotating collar 315 for creating polished edges on the perimeter of the work piece or inside the sink hole. Stone countertops typically have the perimeter edges polished to match the working surface of the countertop. To create a polished edge, the operator will need to use finer grits of abrasive. The abrasive cutter will need to follow a template to maintain the desired line. The abrasive wheel will be consumed in the process and the diameter will change shape. This rotating collar 315 attached to a movement like swing arm 320 with leadscrew 329 allows the operator to readjust the distance between abrasive and template. This adjusting allows for proper control of the abrasive against stone 10.

In an alternative embodiment, rotating collar 315 would be fixed to base 335. In this embodiment, the motor assembly 313 with abrasive drum 311 would move relative to base 335. This movement of motor within base will accomplish the same task in that this adjustment would allow the operator to compensate for grinding wheel wear.

In a further alternative embodiment, the geometry of abrasive drum 311 may be varied from drum shaped to other shapes and contours. This allows the operator to select an abrasive shape suited to a particular need, profile or surface finish.

These three apparatuses of the present invention and method described above provide a portable means to cut a sink hole. This manual method allows the mason to use the faster cutting saw blades while being guided by a template and gives the mason an error free sink hole ready for polishing. The method is safer in that the operator's hands are farther away from the abrasive wheel. The work is made easier because the weight of the apparatus is bearing on the template and the template guiding the cutter makes it easy for the operator to follow the desired cut line.

Various embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A portable cutting apparatus for cutting holes in stone while following an inside edge of a sink template, comprising:
   a motor coupled with and operatively rotating a shaft about a shaft longitudinal axis;
   a contour saw blade coupled to and rotating with said shaft about said shaft longitudinal axis;
   a base adapted to operatively move upon at least one of said sink template and said stone;
   a guide fence adjustable to alter a distance between said contour saw blade and said sink template;
   a motor carriage pivotally coupled to said base and affixed to said motor;
   a means to lower said contour saw blade into said stone;
   a spring loaded ratchet pawl engaging a stationary gear holding said contour saw blade at a desired height from said sink template; and
   a bistable tension spring that pulls said ratchet pawl into said stationary gear when said ratchet pawl is in a first position engaging said stationary gear, and that pulls said ratchet pawl away from said stationary gear when said ratchet pawl is in a second position rotated from said first position and disengaged from said stationary gear;
   wherein said ratchet pawl further comprises:
      a large pawl;
      a small pawl nested with said large pawl;
      a knob to rotate said large pawl;
      a curved gear tooth rack that said large pawl and said small pawl alternately engage with;
      a pair of tension springs coupled between a lever handle and said small pawl;
      a tension spring coupled between said lever handle and said large pawl; and
      a pin within a slot defining a range of movement of said large pawl relative to said small pawl.

2. The portable cutting apparatus of claim 1, wherein said means to lower said contour saw blade into said stone further comprises at least one handle squeezed to plunge said contour saw blade in an arc motion into said stone.

3. The portable cutting apparatus of claim 1, further comprising:
   at least one track defining an arcuate path spaced from an axis defined by said motor carriage pivot relative to said base, said at least one track coupled to said base; and
   at least one roller coupled to said motor carriage and slidable within said at least one track.

* * * * *